US008733636B2

(12) United States Patent
Henry et al.

(10) Patent No.: US 8,733,636 B2
(45) Date of Patent: *May 27, 2014

(54) METHOD AND APPARATUS FOR MONEY TRANSFER

(71) Applicant: MoneyGram International, Inc., Minneapolis, MN (US)

(72) Inventors: James M. Henry, River Falls, WI (US); Billy Joe Steiger, Jr., Orvilla, TX (US)

(73) Assignee: Moneygram International, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,152

(22) Filed: Jun. 3, 2013

(65) Prior Publication Data
US 2013/0339227 A1 Dec. 19, 2013

Related U.S. Application Data

(63) Continuation of application No. 13/251,464, filed on Oct. 3, 2011, now Pat. No. 8,453,923, which is a continuation of application No. 12/870,934, filed on Aug. 30, 2010, now Pat. No. 8,028,901, which is a continuation of application No. 11/839,280, filed on Aug. 15, 2007, now Pat. No. 7,798,397, which is a continuation-in-part of application No. 11/068,090, filed on Feb. 28, 2005, now Pat. No. 7,258,268.

(51) Int. Cl.
*G07F 19/00* (2006.01)

(52) U.S. Cl.
USPC ......................................................... 235/379

(58) Field of Classification Search
USPC .......................... 235/376, 379, 382; 705/379
See application file for complete search history.

(56) References Cited

U.S. PATENT DOCUMENTS

| | | | |
|---|---|---|---|
| 5,420,405 | A | 5/1995 | Chasek |
| 5,659,165 | A | 8/1997 | Jennings et al. |
| 5,825,003 | A | 10/1998 | Jennings et al. |
| 5,956,700 | A | 9/1999 | Landry |
| 5,963,647 | A | 10/1999 | Downing et al. |
| 6,012,048 | A | 1/2000 | Gustin et al. |
| 6,039,250 | A | 3/2000 | Ito et al. |
| 6,173,272 | B1 | 1/2001 | Thomas et al. |
| 6,267,292 | B1 | 7/2001 | Walker et al. |
| 6,317,745 | B1 | 11/2001 | Thomas et al. |

(Continued)

FOREIGN PATENT DOCUMENTS

GB        2370146        6/2002

OTHER PUBLICATIONS

MoneyGram International, Inc. MoneyGram® eMoney Transfer. Printout of computer screen images of product electronic commerce documents. 1995. 109 pages.

*Primary Examiner* — Seung Lee
(74) *Attorney, Agent, or Firm* — Dorsey & Whitney LLP

(57) ABSTRACT

A staged bill payment transaction method comprises receiving transaction information from a user terminal at a kiosk, building a staging record at a data center in communication with the kiosk, and providing a retrieval key to the sender. The transaction information includes sender and biller information, for example where the sender has an account with the biller. The staging record comprises the transaction information and the retrieval key, which identifies the staging record for finalizing the transaction. If the retrieval key leads to the staging record at the data center, the staged bill payment transaction proceeds to credit a send amount to biller. If not, the transaction is rejected.

20 Claims, 24 Drawing Sheets

(56) References Cited

U.S. PATENT DOCUMENTS

| | | |
|---|---|---|
| 6,408,203 B2 | 6/2002 | Mackin |
| 6,488,203 B1 | 12/2002 | Stoutenburg et al. |
| 6,502,747 B1 | 1/2003 | Stoutenburg et al. |
| 6,547,132 B1 | 4/2003 | Templeton et al. |
| 6,554,184 B1 | 4/2003 | Amos |
| 6,609,113 B1 | 8/2003 | O'Leary et al. |
| 6,736,314 B2 | 5/2004 | Cooper et al. |
| 6,761,309 B2 | 7/2004 | Stoutenburg et al. |
| 6,769,605 B1 | 8/2004 | Magness |
| 6,814,282 B2 | 11/2004 | Seifert et al. |
| 6,827,260 B2 | 12/2004 | Stoutenburg et al. |
| 6,886,742 B2 | 5/2005 | Stoutenburg et al. |
| 6,908,031 B2 | 6/2005 | Seifert et al. |
| 7,120,608 B1 | 10/2006 | Gallagher et al. |
| 7,258,268 B2 | 8/2007 | Steiger, Jr. |
| 2003/0083987 A1 | 5/2003 | Stoutenburg et al. |
| 2003/0110129 A1 | 6/2003 | Frazier et al. |
| 2003/0169881 A1 | 9/2003 | Niedermeyer |
| 2003/0208439 A1 | 11/2003 | Rast |
| 2003/0222135 A1 | 12/2003 | Stoutenburg et al. |
| 2004/0143552 A1 | 7/2004 | Weichert et al. |
| 2004/0177014 A1 | 9/2004 | Cowell |
| 2005/0209958 A1 | 9/2005 | Michelsen et al. |
| 2006/0054683 A1 | 3/2006 | Michelsen et al. |
| 2006/0206421 A1 | 9/2006 | Knapp |
| 2007/0005498 A1 | 1/2007 | Cataline et al. |
| 2008/0033877 A1 | 2/2008 | Blair et al. |
| 2008/0114697 A1 | 5/2008 | Black et al. |

Fig.2

US TO US (EXCEPT STATE A)

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| US | US | SEND | A | X | | | | | |
| US | US | SEND | B | X | X | X | X | X | |
| US | US | SEND | C | X | X | X | X | X | X |
| US | US | RECEIVE | D | X | | | | | |
| US | US | RECEIVE | E | X | X | | | | |
| US | US | RECEIVE | F | X | X | X | X | X | X |

STATE A TO US

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| STATE A | US | SEND | A1 | X | X | | | | |
| STATE A | US | SEND | B1 | X | X | X | X | X | |
| STATE A | US | SEND | C1 | X | X | X | X | X | X |

US TO STATE A

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| US | STATE A | RECEIVE | D1 | X | X | | | | |
| US | STATE A | RECEIVE | E1 | X | X | | | | |
| US | STATE A | RECEIVE | F1 | X | X | X | X | X | X |

US TO OUS; OUS TO US

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| US | OUS | SEND | A2 | X | X | X | X | X | |
| US | OUS | SEND | B2 | X | X | X | X | X | |
| US | OUS | SEND | C2 | X | X | X | X | X | X |
| OUS | US | RECEIVE | D2 | X | X | | | | |
| OUS | US | RECEIVE | E2 | X | X | X | X | X | |
| OUS | US | RECEIVE | F2 | X | X | X | X | X | X |

AMOUNTS A, A1, A2, B, ETC. SET FORTH IN US$ EXCEPT WHERE RULES REQUIRE USE OF FOREIGN CURRENCY.

SEND TRANSACTION STAGING

| SENDER | CALL CENTER | DATA CENTER |
|---|---|---|
| SENDER CALLS WITH REGULAR PHONE OR DEDICATED PHONE WITH AUTODIAL | ‹CSR ANSWERS CALL<br><br>‹CSR ASKS WHAT TRANSACTION DESIRED (SEND/RECEIVE/PAYMENT; THIS DISCUSSION ASSUMES MONEY SEND) | |
| ›SENDER PROVIDES: SENDER NAME, ADDRESS; RECIPIENT NAME; PROPOSED SEND AMOUNT (PSA); AND ADDITIONAL TRANSACTION INFORMATION AS REQUIRED | ›CSR KEYS IN INFO<br><br><br><br><br><br>CSR RECEIVES QUOTE TO REPORT TO SENDER‹ | ›PSA AND OTHER DATA RECEIVED AND USED TO:<br><br>‹PROVIDE PRICING QUOTE, DETERMINE COMPLIANCE LEVEL (BASED ON STATE AND FEDERAL REGULATIONS) AND START SEND STAGING RECORD |
| ›SENDER PROVIDES COMPLIANCE INFO PER CSR REQUEST | ‹CSR ASKS FOR COMPLIANCE INFORMATION CORRESPONDING TO LEVEL IN COMPLIANCE CHART<br><br>›CSR KEYS IN COMPLIANCE INFO<br><br>‹CSR REPORT QUOTE TO SENDER | ‹PROMPT FOR COMPLIANCE DATA NEEDED PER COMPLIANCE RULES, WITH COMPLIANCE LEVEL DETERMINED BY PSA AND SENDER-PROVIDED LOCATION<br><br>›RECEIVE COMPLIANCE INFO AND PUT IN STAGING RECORD FIELDS PERMITTING LATER RECOVERY |
| SENDER MAY WRITE RETRIEVAL NO. ON NOTEPAD | ‹RETRIEVAL NO. PROVIDED ORALLY | ‹STAGING RECORD COMPLETED AND RETRIEVAL NO. PROVIDED |

Fig.3A

SEND TRANSACTION FINALIZING

| SENDER | AGENT | DATA CENTER |
|---|---|---|
| SENDER AT AGENT DESK | ‹AGENT ASKS FOR RETRIEVAL NO. AND REQUESTED SEND AMOUNT<br><br>›AGENT KEY IN RERIEVAL NO. AND AMOUNT<br><br>›TERMINAL PROVIDES AGENT LOCATION | ›RECEIVE RETRIEVAL NO.<br><br>USE RETRIEVAL NO. TO RETRIEVE STAGING RECORD, DETECT TRANSACTION TYPE FROM RECORD (SEND/RECEIVE/PAYMENT) AND SEND RECORD TO AGENT (THIS DISCUSSION ASSUMES SEND, NOT RECEIVE OR PAYMENT |
|  | RETRIEVED STAGING RECORD AND SEND AMOUNT COMBINED IN TERMINAL, THEN SENT TO DATA CENTER FOR INITIAL PRICING<br><br>RECEIVE INITIAL PRICING AND DISPLAY ON TERMINAL‹ | ‹DATA CENTER COMPUTES INITIAL PRICING AND COMPLIANCE LEVELS AND SENDS TO TERMINAL |
| SENDER CONFIRMS TRANSACTION (SENDER, RECEIVER, AMOUNT, SERVICE TYPE)› | ‹AGENT ASKS CONSUMER TO CONFIRM TRANSACTION |  |
| ›SENDER PROVIDES PHOTO ID. (NOTE THAT THE STAGING RECORD MAY CONTAIN HIGHER LEVEL COMPLIANCE DATA BUT THE CORRESPONDING VERIFICATION IS NOT REQUIRED | ‹AGENT ASKS FOR SENDER'S PHOTO ID (IF REQUIRED), E.G., DRIVER'S LICENSE, PASSPORT, OR ALIEN CARD<br><br>›AGENT CHECKS PHOTO ID OFFERED AND ENTERS "YES" OR "NO" AT TERMINAL FOR WHETHER ID WAS VERIFIED<br><br>RETRIEVED STAGING RECORD, SEND AMOUNT, WHETHER PHOTO ID WAS VERIFIED AND AGENT JURISDICTION SENT TO DATA CENTER› | ›RETRIEVED STAGING RECORD AND SEND AMOUNT RECEIVED AT DATA CENTER TO: DEVELOP FINAL PRICING FOR SEND AND DETERMINE COMPLIANCE LEVEL (BASED ON CHART RESPONSIVE TO STATE AND FEDERAL REGULATIONS; BOTH DONE NOW WITH SPECIFIC JURISDICTION FOR AGENT |

Fig. 3B

| SENDER | AGENT | DATA CENTER |
|---|---|---|
| | | LOCATION KNOWN<br><br><SEND FINAL PRICING OR DECLINE TRANSACTION IF SEND AMOUNT IS OVER THE COMPLIANCE LIMIT; OR IF INSUFFICIENT COMPLIANCE DATA WAS PROVIDED IN THE REQUESTED TRANSACTION (DECLINED TRANSACTION DOES NOT PROCEED.) |
| >SENDER PAYS PRICE=SEND AMOUNT PLUS FEES<br><br><br><br><br><br><br><br><br><br><br><br>>SENDER SIGNS AND RETURNS AGENT COPY OF RECIEPT | >AGENT CONFIRMS PAYMENT RECEIVED<br><br>>SEND TRANSACTION RECORD WITH SEND AMOUNT, AGENT JURISDICTION, WHETHER PHOTO ID WAS VERIFIED IS SENT TO THE DATA CENTER AGAIN FOR COMMITMENT<br><br><AGENT GIVES CHANGE (IF REQUIRED), PROVIDES AGENT RECEIPT TO CONSUMER AND ASKS CONSUMER TO SIGN AGENT RECEIPT<br><br><AGENT PROVIDES CONSUMER RECEIPT TO SENDER. RECEIPT CONTAINS REFERENCE NO. (TRANSACTION NO.) | SEND TRANSACTION COMMITTED. |

Fig.3C

RECEIVE TRANSACTION STAGING

| RECIPIENT | CALL CENTER | DATA CENTER |
|---|---|---|
| RECIPIENT CALLS WITH REGULAR PHONE OR DEDICATED PHONE WITH AUTODIAL | ‹CSR ANSWERS CALL<br><br>‹CSR ASKS WHAT TRANSACTION DESIRED (SEND/RECEIVE/PAYMENT; THIS DISCUSSION ASSUMES MONEY RECEIVE)<br><br>‹IF TRANSACTION IS A RECEIVE, CSR ASKS FOR A TRANSACTION NO. | |
| ›RECIPIENT PROVIDES NAME, ADDRESS, TRANSACTION NO., AMOUNT; AND ADDITIONAL TRANSACTION INFORMATION AS REQUIRED | ›CSR KEYS IN INFO AND RECEIVES TRANSACTION STATUS TO REPORT TO RECIPIENT | ›TRANSACTION NO. RECEIVED AND USED TO RETRIEVE COMMITTED SEND RECORD<br><br>DETERMINE COMPLIANCE LEVEL (BASED ON STATE AND FEDERAL REGULATIONS) AND START RECEIVE STAGING RECORD |
| ›RECIPIENT PROVIDES COMPLIANCE INFO PER CSR REQUEST | ‹CSR ASKS FOR COMPLIANCE INFORMATION CORRESPONDING TO LEVEL IN COMPLIANCE CHART<br><br>›CSR KEYS IN COMPLIANCE INFO<br><br>‹CSR REPORTS TRANSACTION STATUS TO SENDER | ‹PROMPT FOR COMPLIANCE DATA NEEDED PER COMPLIANCE RULES, WITH COMPLIANCE LEVEL DETERMINED BY SENT AMOUNT AND RECIPIENT-PROVIDED LOCATION<br><br>›RECEIVE COMPLIANCE INFO AND PUT IN RECEIVE STAGING RECORD FIELDS, PERMITTING LATER RECOVERY |
| RECIPIENT MAY WRITE RERIEVAL NO. ON NOTEPAD | ‹RETRIEVAL NO. PROVIDED ORALLY | ‹RECEIVE STAGING RECORD COMPLETED<br><br>‹RETRIEVAL NO. PROVIDED |

Fig. 4A

RECEIVE TRANSACTION FULFILLMENT

| RECIPIENT | AGENT | DATA CENTER |
|---|---|---|
| RECIPIENT AT AGENT DESK | ‹AGENT ASKS FOR RETRIEVAL NO. AND AMOUNT<br><br>›AGENT KEYS IN RETRIEVAL NO. AND AMOUNT<br><br>›TERMINAL PROVIDES AGENT LOCATION | ›RECEIVE RETRIEVAL NO.<br><br>USE RETRIEVAL NO. TO RETRIEVE RECEIVE STAGING RECORD, DETECT TRANSACTION TYPE FROM RECORD (SEND/RECEIVE/PAYMENT) AND SEND RECORD TO AGENT (THIS DISCUSSION ASSUMES RECEIVE, NOT SEND OR PAYMENT) |
|  | RETRIEVED STAGING RECORD AND ASSOCIATED TRANSACTION INFORMATION, INCLUDING AMOUNT COMBINED IN TERMINAL, THEN SENT TO DATA CENTER FOR COMPLIANCE ANALYSIS AND STATUS<br><br>TERMINAL RECEIVES TRANSACTION RECORD AND DISPLAYS ON TERMINAL‹ | ‹DATA CENTER FINDS TRANSACTION RECORD, DETERMINES COMPLIANCE LEVEL AND TRANSACTION STATUS AND SENDS TO TERMINAL |
| RECIPIENT CONFIRMS TRANSACTION (SENDER, RECIPIENT, AND AMOUNT,)› | ‹AGENT ASKS RECIPIENT TO CONFIRM TRANSACTION |  |
| ›RECIPIENT PROVIDES PHOTO ID. (NOTE THAT THE STAGING RECORD MAY CONTAIN HIGHER LEVEL COMPLIANCE DATA BUT THE CORRESPONDING VERIFICATION IS NOT REQUIRED.) | ‹AGENT ASKS FOR RECIPIENT'S PHOTO ID (IF REQUIRED), E.G., DRIVER'S LICENSE, PASSPORT, OR ALIEN CARD.<br><br>›AGENT CHECKS PHOTO ID OFFERED, AND ENTERS "YES" OR "NO" AT TERMINAL FOR WHETHER ID WAS VERIFIED.<br><br>RETRIEVED STAGING RECORD, AMOUNT, WHETHER PHOTO ID WAS VERIFIED AND AGENT LOCATION SENT TO DATA CENTER› | ›RETRIEVED STAGING RECORD AND AMOUNT RECEIVED AT DATA CENTER TO: DETERMINE COMPLIANCE LEVEL (BASED ON CHART RESPONSIVE TO STATE AND FEDERAL REGULATIONS; BOTH DONE NOW |

Fig. 4B

RECEIVE TRANSACTION FULFILLMENT

| RECIPIENT | AGENT | DATA CENTER |
|---|---|---|
|  | IF TRANSACTION FAILS, AGENT NOTIFIES RECIPIENT THAT TRANSACTION NEEDS TO BE RESTAGED | WITH SPECIFIC STATE FOR AGENT LOCATION) KNOWN)<br><br>‹RECEIVE ACCEPTANCE OR DECLINE TRANSACTION IF AMOUNT IS OVER THE COMPLIANCE LIMIT; OR IF INSUFFICIENT COMPLIANCE DATA WAS PROVIDED IN THE REQUESTED TRANSACTION OR IF TRANSACTION STATUS IS "ALREADY RECEIVED." (DECLINED TRANSACTION DOES NOT PROCEED.) |
| ›RECIPIENT CONFIRMS PAYOUT METHODS TO AGENT<br><br>RECIPIENT SIGNS AND RETURNS AGENT COPY OF RECEIPT | ‹AGENT ASKS RECIPIENT FOR PAYOUT METHODS., E.G., CASH, CHECK, ETC.<br><br>‹AGENT GIVES MONY TO RECIPIENT IN THE FORM OF THE PAYOUT METHOD(S) SELECTED ALONG WITH AGENT RECEIPT, AND ASKS REIPIENT TO SIGN AGENT RECEIPT<br><br>AGENT TERMINAL NOTIFIES PAYOUT TO DATA CENTER›<br><br>‹AGENT PROVIDES CONSUMER RECEIPT TO RECIPIENT. RECEIPT CONTAINS REFERENCE NO. (TRANSACTION NO.) | DATA CENTER MARKS TRANSACTION RECORD WITH PAID OUT TRANSACTION STATUS |

Fig.4C

| SEND TRANSACTION STAGING RECORD | —500 |
|---|---|
| STAGING RETRIEVAL KEY | —510 |
| SENDER NAME | —512 |
| SENDER ID DATA | —514 |
| RECIPIENT NAME/LOCATION | —516 |
| RECIPIENT SECURITY DATA | —518 |
| COMPLIANCE DATA | —520 |
| ADDITIONAL TRANSACTION INFORMATION | —522 |
| EXPIRATION DATE | —524 |

Fig.5A

| COMMITTED SEND TRANSACTION RECORD | —550 |
|---|---|
| SEND TRANSACTION KEY OR IDENTIFIER | —560 |
| SEND AMOUNT | —562 |
| SERVICE TYPE | —564 |
| FEES | —566 |
| SENDER NAME | —568 |
| SENDER ID DATA | —570 |
| RECIPIENT NAME/LOCATION | —572 |
| RECIPIENT SECURITY DATA | —574 |
| COMPLIANCE DATA | —576 |
| ADDITIONAL TRANSACTION INFORMATION | —578 |
| RETENTION INFORMATION | —580 |
| STATUS | —582 |

Fig.5B

| | |
|---|---|
| RECEIVE TRANSACTION STAGING RECORD | 600 |
| STAGING RETRIEVAL KEY | 610 |
| RECIPIENT NAME | 612 |
| RECIPIENT ID DATA | 614 |
| SEND TRANSACTION POINTER | 616 |
| RECIPIENT SECURITY DATA | 618 |
| COMPLIANCE DATA | 620 |
| ADDITIONAL TRANSACTION INFORMATION | 622 |
| EXPIRATION DATE | 624 |

MoneyGram.
MoneyTransfer

→ Home  → Sign Out  → Help

→ Send Same Day Service  → Send Economy Service  → Send ExpressPayment  → Past Transfers  → Profile Welcome, Joseph Anderson

Send Same Day Service

Receiver Information — 816

Joseph E Anderson

Middle Initial:

Last Name:

Second Last Name: *(Required if receiver has second last name)*

Message to Receiver:

Back    Next

Part 3 of 6

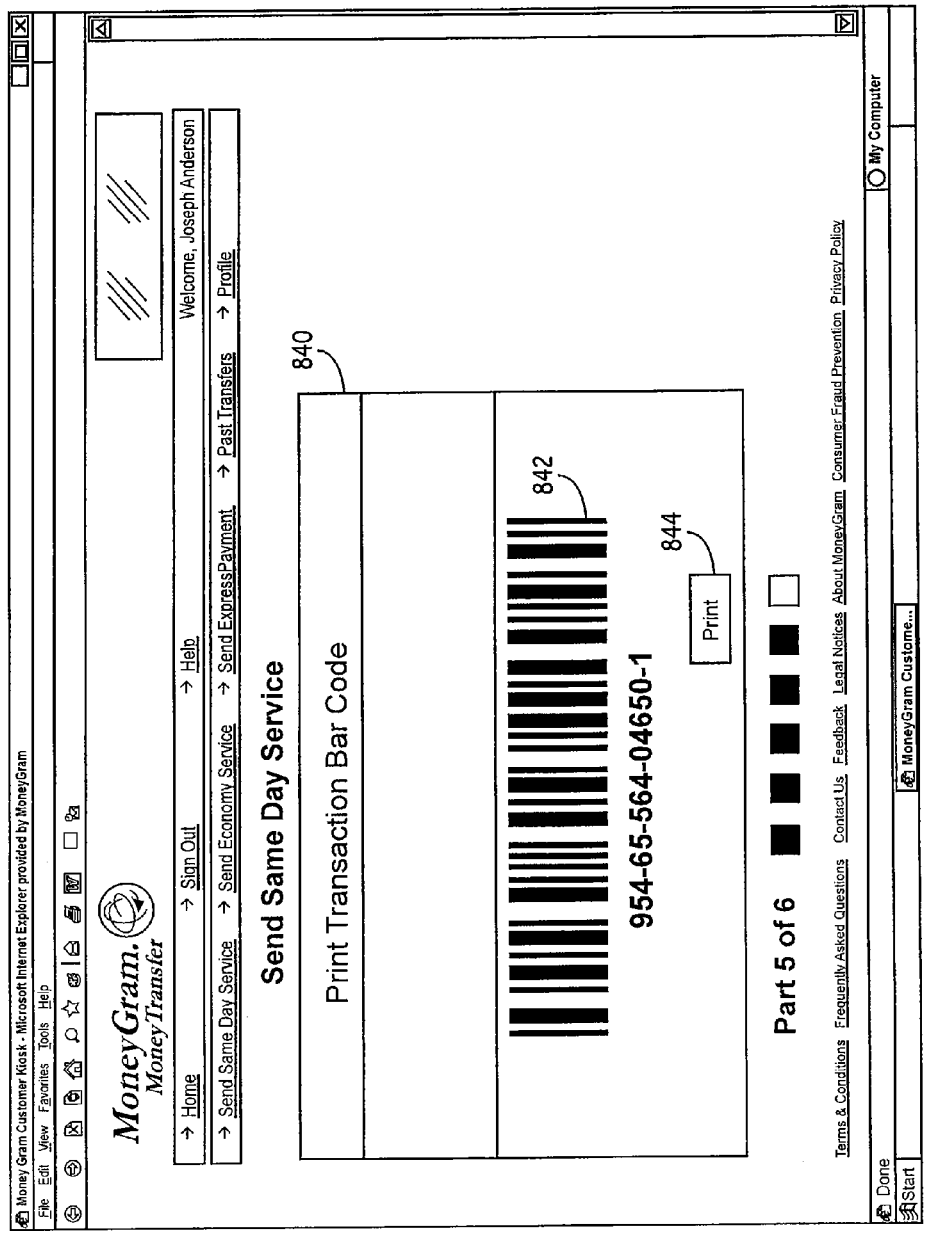

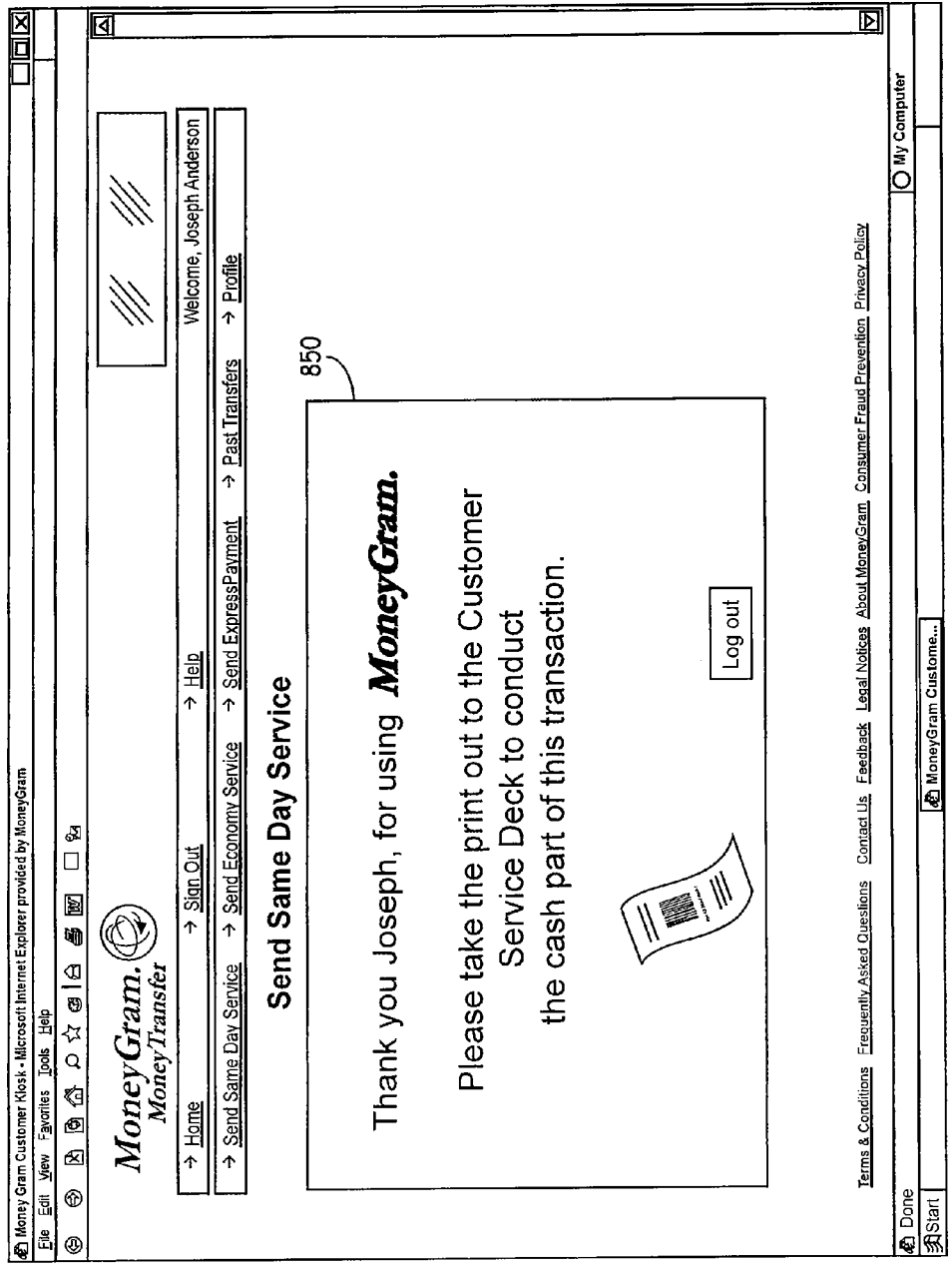

METHOD AND APPARATUS FOR MONEY TRANSFER

CROSS-REFERENCE TO RELATED APPLICATIONS

This application is a continuation of U.S. application Ser. No. 13/251,464, filed Oct. 3, 2011 and issued Jun. 4, 2013, as U.S. Pat. No. 8,453,923, which is a continuation of U.S. application Ser. No. 12/870,934, filed Aug. 30, 2010 and issued Oct. 4, 2011 as U.S. Pat. No. 8,028,901, which is a continuation of U.S. application Ser. No. 11/839,280, filed Aug. 15, 2007 and issued Sep. 21, 2010, as U.S. Pat. No. 7,798,397, which is a continuation-in-part of U.S. application Ser. No. 11/068,090, filed Feb. 28, 2005, issued Aug. 31, 2006, as U.S. Pat. No. 7,258,268, each of which is incorporated by reference herein.

BACKGROUND

The present invention relates to an apparatus and methods for transferring money or monetary value. More specifically, the present invention relates to a system for managing data to perform send, receive and payment transactions for money transfers.

It is increasingly common for funds to be transferred electronically. This can occur from individual to individual or from business to business or between an individual and a business. The transfers may occur within one country or across borders, from one country into another, and thus may involve a currency change.

In some cases one or both of the individuals or businesses involved may lack an account at a bank or a credit card. Thus, the funds for the transfer often must be provided in cash (or equivalent) and the payout to the recipient may also preferably be in cash (or equivalent).

Large bank and non-bank financial institutions are involved in money transfers. To extend their geographical coverage, the institutions engage agents and may equip them with specialized terminals or other facilities to facilitate communications necessary for money transfers. The personnel of such agents may not be well educated or highly trained and may do several other tasks (such as service as retail sales clerks). This requires a system that is easy to use, requires a minimum of equipment, deters mistakes and fraud and minimizes agent personnel time.

One method of initiating or staging such transactions has been the use of a call center that receives calls from persons wishing to transfer money or to receive money transferred. The call center representative collects information sufficient to stage a transaction and provides the caller with a reference or retrieval number that the caller then takes to an agent to fulfill the staged transaction, whether it is a send, receive, bill payment or other transaction. The call center transaction staging interaction results in a staged transaction record that facilitates the fulfillment agent's work to finalize the transaction.

While the call center can provide a personal touch to the service, its staffing can be expensive and may require personnel with special language skills in several languages. In addition, such personnel require additional training when procedures and systems are changed.

The agent who is involved in fulfillment may have a compact custom terminal specifically designed for transactions of this type or the agent may have more generalized point of sale device, such as an electronic cash register, equipped with a scanning device for product barcodes, for check reading or optical character recognition or for magnetic card reading, which has associated software for money transfer transactions. Generally, to fulfill a staged transaction, the agent is required to call up and review a record and follow instructions associated with a particular transaction. The agent may enter information to call up the transaction record and to provide new or updated transaction details. This takes time and involves the opportunity for error in manual inputting of information.

To make money transfers efficient and to handle the large volume, electronic systems may be used and it is desirable that personnel time is minimized. Thus, there is a need for improved money transfer systems and methods that assist the parties involving in complying with the applicable regulations in various jurisdictions, that provide procedures to minimize the amount of personnel time per transaction and that are otherwise economically efficient.

SUMMARY

The present invention, in one embodiment, is a method of performing a money transfer that involves receiving information at an automated kiosk from a user for a money transfer transaction, including a transaction type selection and, responsive to the information from the user received at the kiosk, building a staging record for the transaction. The staging record includes at least a retrieval key to identify the staging record and a transaction type identifier. The method provides to the sender from the kiosk a machine readable staged transaction token with staging information stored thereon, including the retrieval key for use in transaction fulfillment.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2 is a chart showing an example of transaction amount ranges and the corresponding required identification and information, developed for a money transfer system, based on government laws and regulations.

FIGS. 3A-3C are charts showing interactions involved in performing money transfer send transaction staging and funding/finalizing with a call center.

FIGS. 4A-4C are charts showing interactions involved in performing money transfer receive transaction staging and fulfillment with a call center.

FIGS. 5A and 5B are schematic diagrams showing the fields used in a send staging record and in a committed send transaction record.

FIG. 6 is a schematic diagram showing the fields used in a receive staging record.

FIGS. 8A-8L are screenshots showing the sequence of steps performed at a staging kiosk.

DETAILED DESCRIPTION

Figure 1:
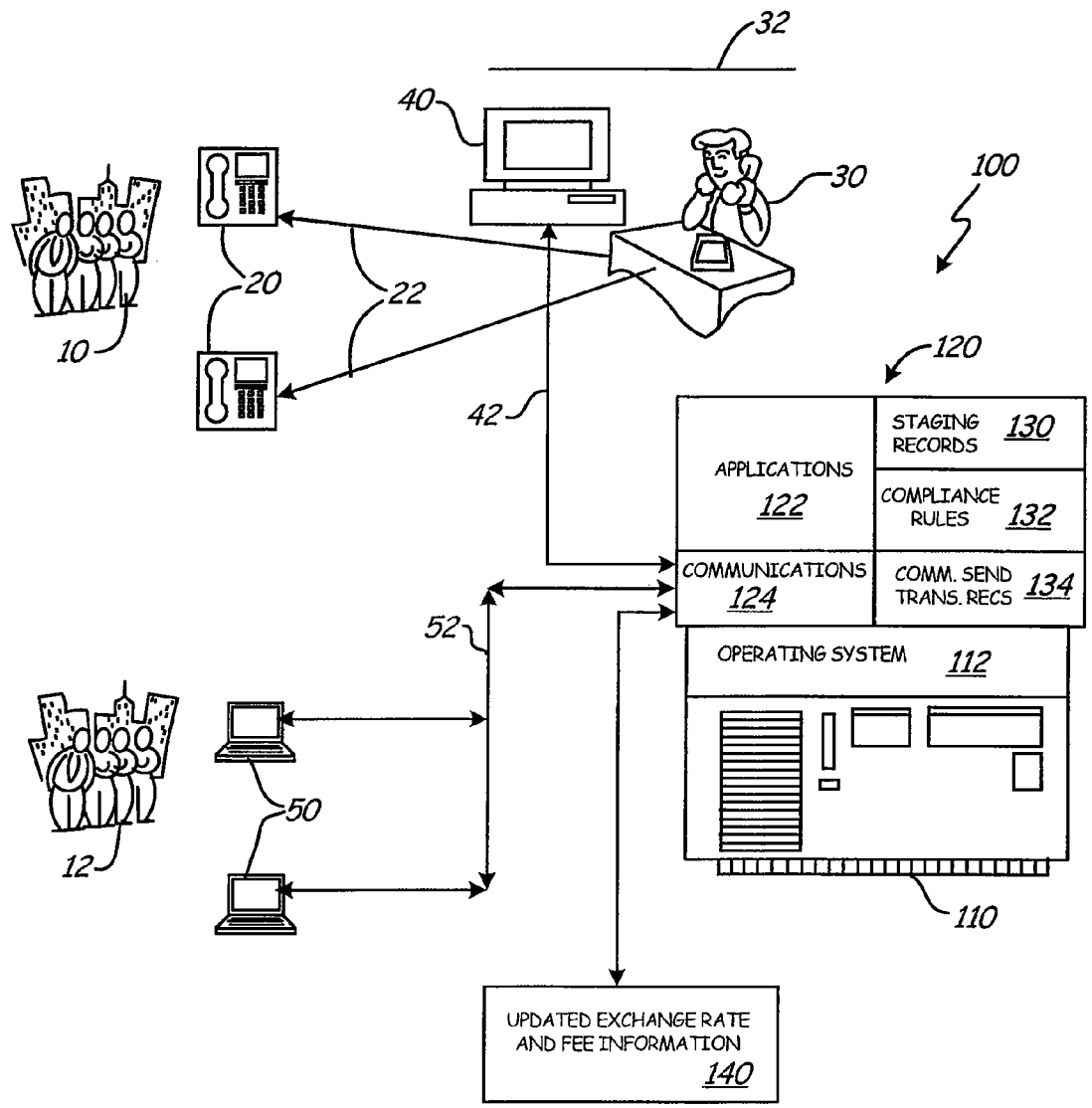
FIG. 1 is a schematic block diagram of a system for performing money transfer send, receive and payment transactions.

Basic Elements of System with Call Center. FIG. 1 is a schematic block diagram of a system 100 for performing money transfer send and receive transactions. In the system as shown in FIG. 1, users (who at various times may be senders or recipients) 10 use a telephone or other communication device 20 to contact a customer service representative (CSR) 30 at a call center (or network) 32. The CSR will be one of several working at the center (or network) 32 and receiving communications from users 10 using one of the plurality of communication devices 20 via a transmission path 22. The devices 20 are spread over the geography served by a financial institution that operates the money transfer system. For example, a device 20 may be a home telephone or may be a dedicated telephone located at an agent office. One purpose of a user-CSR interaction is for a sender to stage a send transaction from the sender to a person or entity, who may be located in the same country or in a different country from the sender. A second purpose of a user-CSR transaction is for a recipient to stage a receive transaction, once a committed send transaction makes funds available. A common purpose in both of these situations is to do much of the compliance work and other transaction preparation, so as to reduce the activity and time that is required in the later interaction with an agent.

FIG. 1 also shows that persons 12 who are senders who have staged a transfer or recipients who have staged a receive transaction may go to an agent office where there are agent terminals 50. There may be one or more agent offices with one or more agent terminals 50 spread over the geography served by a financial institution that operates the money transfer system. The agent terminals 50 typically are set up to handle at least two kinds of interactions and transactions. First, if the sender 12 has previously dealt with a CSR and set up a send staging record, then the sender will go to the agent office to finalize the send with an actual requested send amount and fees and to make the payment to the agent that enables the send to be finalized. Second, if the send transaction has already been funded and finalized and the committed transaction record is available for receiving at agent terminals 50 (typically the recipient has staged the receive transaction), the recipient 12 can go to an agent office to obtain the funds sent.

FIG. 1 shows that the CSR 30 has a terminal 40 that is used to build a send staging record based on information provided to the CSR by the sender 10 or a receive staging record based on information provided to the CSR by a recipient 10. The terminal 40 is in communication with a central computer system or data center 120 via a transmission path 42, which may be a telephone line, data line, or other wired or wireless link, e.g., a leased line or a link using the Internet. The transmission path 42 terminates at a communications module 124 that can pass information to and from any of the software modules running on the hardware 110 and its operating system 112. The software modules include applications 122 that implement the various functions discussed below. The data used by applications 122 and other software includes staging records 130, records incorporating compliance rules 132 and committed send transaction records 134. These may be in one or more separate databases. In one embodiment, separate databases are used, because the committed send transactions are in a financial records database that is protected with greater security measures.

FIG. 1 also shows that agent terminals 50 are in communication with the central computer system or data center 120 via a transmission path 52, which may be a telephone line, data line, or wired or wireless link. The transmission path 52 terminates at the communications module 124. FIG. 1 further shows that the central computer 120 receives updated exchange rate and fee information from data source 140, which derives the information from various market data and internal sources of the financial institution.

Automation of portions of the system as shown in FIG. 1 is possible. In one embodiment, where the device 20 is a telephone, the terminal 40 is an automated voice-response terminal and the human CSRs functions are taken over by the terminal 40 and its controlling software. In another embodiment, the device 20 is itself a terminal 40 at which a user 10 is guided through entry of information at a keyboard, touch-screen or other similar device to provide information to a terminal where there is a human CSR to review the inputs and intervene if needed, or the device 20 may interact with an automated terminal 40 or with software running on a CPU at the terminal 40 or at the data center 120. In the latter case, functions of the call center 32 and the CSR are performed as part of the data center 120 operations. Interactions with the CSR become telecommunications interactions with software executing at the data center 120. The call center 32 becomes a component of the data center 120. In these scenarios, as in the less-automated situation depicted in FIG. 1, the user input by voice or manual entry provides the information necessary to build the staging record for the desired transaction.

The call center 32 may be a single geographical location or a number of locations linked together to provide sufficient CSRs 30 and/or terminals 40, with appropriate language capability to effectively handle the contacts initiated at the devices 20. Because the devices 20 may be located in multiple jurisdictions and the CSRs would typically not be in the same jurisdiction as the users, during the CSR-user interaction the CSR 30 must obtain location information relevant to the transaction from the user 10 at the specific device 20 employed by the user 10.

As noted above, the money transfer operations of interest are subject to state and/or federal laws and regulations (and potentially laws of multiple nations). The financial institution needs to ensure as far as possible that all its money transfer transactions are executed in compliance with the applicable laws and regulations. These vary by jurisdiction. Thus, the applications 122 that are used to stage and carry through send transactions and receive transactions are configured to apply the necessary laws and regulations by the way the software applications 122 are written and by software interaction with compliance rules that may be specified in a compliance rules data base 132.

Compliance Rules. FIG. 2 shows an example of the kind of compliance rules that may be implemented in a data structure and database in a money transfer system. In this simplified example, there are U.S. laws and regulations, and State A within the U.S. has its own laws and regulations for money transfer send transactions that originate within its borders and money transfer receive transactions that occur with a recipient going to an agent within its borders. The example also shows that transactions between the U.S. and a country outside the U.S. ("OUS") may have different compliance rules than for transactions where the sender and recipient are both in the U.S.

The general nature of these laws and regulations is that they include identification requirements, which escalate as the transaction amount increases. This applies to both send and receive money transfer transactions. There usually is also an absolute maximum amount that can be sent or received. When a transaction occurs within the U.S. and does not involve State A and, assuming for simplicity that no other states have applicable laws and regulations, then the federal laws and regulations apply. When a transaction occurs across U.S. borders, at a minimum U.S. laws and regulations must be applied, whether the transfer is from the U.S. or into the U.S. State laws and regulations may also be applicable. As countries outside the U.S. become interested in regulating money transfers, these will develop laws and regulations that will apply when a transaction has certain relationships to such countries.

FIG. 2 thus shows a set of compliance rules based on laws and regulations for send and receive transactions within the U.S., but not involving a sender or a recipient in State A ("US to US"). FIG. 2 also shows a separate set of compliance rules based on laws and regulations for send and receive transactions within the U.S., where there is a sender or a recipient subject to the laws of State A ("State A to US"; "US to State A"). Finally, FIG. 2 shows a separate set of compliance rules that may apply for money transfers that cross a U.S. border with the send or the receive occurring in the U.S., but the corresponding receive or send occurring outside the U.S. ("US to OUS"; "OUS to US"). This table may have parameters selected to satisfy U.S. law, the law of a particular state and also laws of a jurisdiction outside the U.S.

The compliance rules may use compliance criteria that match exactly the laws and regulations of the applicable jurisdictions or criteria that are somewhat more stringent but perhaps easier to implement, e.g., taking into account agent resources and risks or configured to satisfy or be compatible with the legal regimes of more than one jurisdiction. The financial institution may by reason of its own concerns about fraud, require more or different identification/information (or the same identification but for lower amounts transferred) than what the laws or regulations would require. Typically, the laws and regulations create at least two ranges for transaction size, a first, lower range (or first transaction size "window") from zero (or some minimum) up to a first maximum send/receive amount, and a second, higher range (or second transaction size "window") from the first maximum up to a second maximum send/receive amount. Frequently three ranges (or "windows") defined by the maximum send/receive amount are involved, and the tables in FIG. 2 show this. Each window has corresponding compliance data requirements (appearing in FIG. 2 to the right of the amount column).

Thus, in the table for the U.S. shown first in FIG. 2, for send transactions, the first range runs from $0.01 up to $A and the second range runs from $A to $B, where B is greater than A, while the third range runs from $B up to $C, where C is greater than B. For example, the following actual amounts might be used: A=$300, B=$600 and C=$5000. Further, in the table for the U.S. shown first in FIG. 2, for receive transactions, the first range runs from $0.01 up to $D and the second range runs from $D to $E, where E is greater than D, while the third range runs from $E up to $F, where F is greater than E. For example, the following actual amounts might be used: D=$400, E=$800 and F=$8000. Of course, the amounts could also be the same for the each of the corresponding levels on the send and receive charts, such that A=D, B=E and C=F, or the same for just some levels.

The tables for transactions involving state A have levels, A1, B1, C1, D1, E1, F1, which may differ from the previously-discussed U.S. table in at least one of the level values and perhaps in all. Similarly, the tables for transactions involving the U.S. and a foreign (OUS) country have levels, A2, B2, C2, D2, E2, F2, which may differ from the U.S. table or the state A chart in at least one of the level values and perhaps in all. In particular, the chart may need to express some levels in a foreign currency instead of a U.S. dollar equivalent. More (or fewer) charts and levels can be implemented in the compliance rules database 132, as required for compliance with the laws and regulations governing where the institution wants to offer service.

As presently configured, the three sets of charts each have three windows for send transactions and for receive transactions. Also each of the three send windows in each set have the same compliance data at the corresponding middle and high levels and each of the three receive windows in each set have the same compliance data at the corresponding low, middle and high levels. Thus, if a transaction falls in the middle level send window in any chart, the compliance data rules for the middle level send window in any other chart will be the same, even if the amount ranges defining the window are different. However, the charts may also be configured so that the windows at any level could differ not only in the ranges for transaction amount but also in the required compliance data. Or the charts could have the same amount ranges but with different required compliance data. The common compliance data requirements at all or most of the respective levels (as shown in FIG. 2) simplify compliance analysis and moving from one set of compliance rules to another.

As will be seen below, in the course of staging a transaction, the CSR will collect sender and recipient location information and use that to determine the applicable jurisdiction (e.g., U.S., State A, OUS country) for a staging phase compliance analysis of both the send and receive sides. This information is often simply what the user verbally reports to the CSR and may not be reliable. Locations reported also may not be the same as the location of a send agent later used to finalize the staged transaction or of the receive agent. Thus, when a send or receive transaction is actually finalized, the actual geographic location of the agent involved will be reported to or determined by the system. This can again be a value reported to or known to the agent, but is preferably a programmed value that is part of an agent terminal profile, specified when the terminal is installed and configured, so that no person need be trusted to accurately or honestly provide the information for determining compliance. The programmed value may be an actual jurisdiction name or code or an address or Zip code or some agent identifier from which the applicable jurisdiction may be found. Alternatively, a real-time GPS location signal might be used to find the location and derive the applicable compliance jurisdiction, if the configured information was not reliable or if the agent terminal might be mobile.

As can be seen from the compliance rules tables in FIG. 2, each row represents a compliance level, i.e., a window or range with corresponding compliance data requirements for transactions in that range. The lowest send amounts may require the sender or recipient to provide an address or an address and photo ID. The larger send amounts may, in addition to the requirements of the lower level(s), require a legal ID (e.g., drivers license, passport, alien card, etc.), occupation information and perhaps other compliance information. In addition, if a third party assists a sender or recipient (e.g., a son/daughter aiding a disabled parent) identification of the third party may be required for the staging record. While the tables in FIG. 2 are relatively simple and might be grasped and implemented by skilled personnel without being built into software, it should be noted that for less skilled personnel, applying these rules consistently could be a challenge. With any significant increase in the number of jurisdictions with separate laws and regulations, the task becomes difficult or impossible to perform consistently even for a skilled person. A further issue is that some personnel may desire to avoid the rules, if they are not made mandatory by the system. As a result, the software implementing the compliance rules is an effective way to provide both guidance and discipline to ensure compliance. The compliance rules 132 may be implemented at the data center 120 as shown, at the CSR terminals 40 or at the agent terminals 50, or at more than one of these. Implementation at the data center 120 and remote communication as needed simplifies any updating required.

Methods and Interactions. In the prior art, it has been typical for send transactions to have both a staging phase and a funding or fulfillment phase. For example, in accordance with some of the teachings of U.S. Pat. No. 6,502,747, a sender has direct access to an employee of a financial services institution and provides the employee send transaction details. These details are stored in a database and typically include the desired amount of money to be sent. A code is then established for the sender to use during the send transaction, i.e., in fulfillment. The sender enters or causes to be entered into an electronic transaction fulfillment device the code, which causes the stored transaction details to be retrieved. The amount of money to be collected from the sender is computed and the sender pays this amount to set up the send transaction. Once the send transaction is established, the sender can inform the recipient and provide the recipient with any transaction identification number or information that may be required. The recipient can then proceed to an agent of the financial services institution and present identification or whatever is required to release to the recipient the amount sent.

In this kind of system it has been noted that some issues occur. The sender may arrive at the fulfillment site with too little funds to fulfill the staged transaction, either by misunderstanding or because there has been a change in pricing or the sender changes his/her mind. The transaction as staged must then be corrected somehow. This either takes agent time or leads back to another staging interaction. The sender may stage the send transaction in one jurisdiction and fulfill it in another. In that case, the compliance work done in staging may no longer be appropriate. The transaction as fulfilled may no longer be in compliance and may need to be re-staged. These situations could result in compliance violations. They can decrease efficiency and thus increase cost to the financial institution and/or agent. They can also be frustrating to customers.

In the present system and method, the staging record is created in a CSR interaction without being tied to a fixed send amount. Instead, a compliance window or range is identified based on proposed send amount, then-available location information and the compliance rules. The CSR requests and sends to the data center the compliance data required by the applicable compliance level rules and provided by the sender. The provided compliance data is documented in the staging record. That is, the staging record is applicable to a range of transactions according to the compliance window applied and the compliance requirements that have been met for that window. With an efficiently defined compliance rule set, a higher level staging record is applicable also to "lower" compliance windows (at least in the same jurisdiction).

At the agent, the sender provides a requested send amount as part of finalizing the transaction. Responsive to the amount and the agent location, the system performs a second analysis using the applicable compliance rules to identify the specific applicable compliance windows on the send and receive side. The system then proceeds to determine if the transaction can be finalized. It must be consistent with the compliance windows determined based on proposed send amount and on the specific location of the agent who will collect the funds and the expected location for the receive, taking into consideration the compliance data provided by the sender and documented in the staging record. Assuming the transaction to be finalized is consistent with the now-identified compliance windows (which may be the same as the ones identified at staging or may be different), the transaction can proceed. If required by an applicable compliance window, the agent is prompted to confirm that the sender presents identification that matches at least a portion of the compliance data stored. Assuming compliance requirements are met, the agent can finalize the send transaction. As will be seen, the compliance windows identified as governing for the send staging record may be used to test compliance of the transaction to be finalized, or, based on revisiting the compliance rules, new compliance windows may be identified and applied. In most instances, the transaction staging will work to set up finalizing, because the send amount that the user requests at the agent is within the compliance windows that govern for finalizing and the compliance data are already in place in the staging record. However, the compliance rules are re-applied during finalizing, and if testing of the transaction to be finalized determines that it is not consistent with the compliance windows now identified as governing, it must be rejected or made to conform. This may mean lowering the amount of the send to fit a lower level compliance window. The agent can change this parameter and resubmit the transaction. A transaction that cannot be made to conform by lowering the amount requires restaging. (Although a terminal at the agent could be configured and connected to permit a transaction to be restaged at the agent, the usual business model for agents makes it desirable for them to spend only a limited time on each user interaction.)

FIGS. 3A-3C show one embodiment of the interactions that are part of the method and implemented in the system of the present application for a send transaction. As set forth in FIGS. 3A-3C, the method has a phase for send transaction staging and a subsequent phase for send transaction finalizing. FIGS. 3A-3C in three columns show actions and communications (direction indicated by ">" or "<") for sender, call center and data center (central computer system). The actions and communications involved in send transaction staging start at the top left of the first chart in FIG. 3A and progress downward and across and back. Similarly, the second chart in FIGS. 3B and 3C shows actions and communications involved in send transaction finalizing. Reference should be made to these charts for the details of the actions and communications.

FIGS. 3A-3C show the application of compliance rules 132 stored at the data center 120 (FIG. 1). In send transaction staging, the sender provides: sender name, address; recipient name and location; proposed send amount (PSA); and additional transaction information as required. The CSR keys in the information and communicates it to the data center. The data center receives the PSA and other data and uses these to provide a pricing quote, determine a compliance level and window (based on applicable regulations) and start a send staging record. The sender address or location information and recipient location are used at the data center to determine pricing (for which the institution may have regional or agent group variations) and to do the initial determination on what compliance rules apply. The CSR receives the quote to report to sender. The data center prompts the CSR for compliance data needed per compliance rules, responsive to the compliance level determined by the PSA and sender-provided locations. The CSR asks for compliance information corresponding to the applicable levels (windows) in the applicable compliance rules chart. Both the send side and the receive side of the transaction must be compliant, so both the send and receive portions of the applicable charts in FIG. 2 are checked. The sender provides the compliance data per CSR request. The data center receives and processes compliance data and stores the resulting compliance data in staging record fields, with a retrieval no. (retrieval key) facilitating later recovery. The CSR reports the price quote to the sender.

In defining the request for compliance information that the CSR makes, the data center will apply the compliance rules to identify the compliance windows that govern and determine the corresponding required levels of compliance information and the compliance data to be stored for that level. For example, if the location provided by the sender indicates the "US to US" send rules apply, then the data center uses the PSA to determine which one of the following windows and corresponding compliance data applies:

$0.01 up to $A: address
$A up to $B: compliance data for level below, plus photo ID, defined by ID Type, ID no., ID issuer and Legal ID
$B up to $C: compliance data for level below, plus occupation, any $3^{rd}$ party information and other compliance information.

Once the sender has provided and the staging record includes the required compliance data, the sender will be able to use the staging record for finalizing any send transaction that is within the corresponding window or any window "below" it (i.e., a window with lesser compliance data requirements, encompassed by the level above), unless changed circumstances cause another compliance window to be the governing one.

The actual format of the compliance data as stored at staging can vary. In one embodiment, the compliance data mirrors all the data actually provided by the sender, i.e., ID type, issuing authority, ID number, etc. In another embodiment, one or more compliance level codes or derived values is used to represent parts of the compliance data or to specify the compliance window or an aspect of it. In a further embodiment, the compliance data is summarized in the form of the maximum PSA that defines the compliance window for a particular jurisdiction. Other variations are possible, but the common element is that the staging record captures the results of the initial analysis to establish the applicable compliance windows and to collect the compliance data required. When the sender attempts to finalize a send transaction at an agent, the compliance rules are re-applied to determine what compliance windows are applicable, and the staging record is consulted to see what compliance data is already collected. This provides a basis for testing a requested send amount that is about to be funded at a particular agent, against the now-identified governing compliance windows, to see if the requested send amount and existing compliance data are consistent with the applicable compliance rules. This will also determine what actual identification documentation (if any) the agent is instructed to review and report as viewed/not viewed.

In finalizing a send transaction, the information of the send staging record is referenced and portions re-used to formulate a committed send transaction record. Because funds will be collected at the agent and the financial institution will commit to making a payout, pricing (including fees and any applicable exchange rate) may be re-checked and compliance re-determined as needed. As seen in the send transaction finalizing portion of FIGS. 3B and 3C, there are interactions between the sender, the agent and the data center. (The agent may be a person with a terminal or an un-staffed terminal (kiosk) sufficiently automated to perform both the interaction and communication functions.) To start finalizing, the agent asks the sender for the retrieval no. supplied upon completion of send staging and the requested send amount. This amount may be the same as or different from the proposed send amount discussed in staging. The agent keys in the retrieval no. and amount. In one embodiment, the terminal provides agent location information (but this could also be done by manual entry by the agent). The data center receives the retrieval no. and use the retrieval no. to retrieve the staging record. The data center detects transaction type from the record (send/receive/payment) and sends the record to the agent.

At the agent, the retrieved staging record and send amount are combined in the terminal 50, then sent to the data center 120 for initial pricing. The data center computes the initial pricing and applies compliance rules and sends results to terminal 50. It should be noted that the data center has now re-determined compliance using the requested send amount and the location information from the terminal 50, which may be different from location information used for compliance for the staging record. The data center 120 communicates its determinations to the agent terminal 50 and (assuming the test for consistency with compliance rules is affirmative, i.e., the transaction to be finalized fits the applicable compliance windows) the agent asks the sender to confirm the transaction. Once the sender confirms the transaction, the agent asks for the sender's photo ID (if required), e.g., driver's license, passport, or alien card or for some other documentation that is relevant to the compliance data required and stored in the staging record. The sender provides the photo ID. The agent checks the photo ID offered and enters "Yes" or "No" at the terminal to indicate whether the photo ID (issuer, name, number, etc.) was verified. The retrieved staging record and send amount transmitted from the agent terminal 50 are used at the data center to: develop final pricing for the send and make a final check on compliance (based on the compliance rules in the charts (FIG. 2) embodying state and federal regulations. Both determinations are done now with the final amount and specific jurisdiction for the agent location known. The data center either sends final pricing or declines the transaction, if the test against the applicable compliance windows is not affirmative. This can occur when the send amount is over a compliance window limit; or if insufficient compliance data has been recorded for the requested send transaction (under the now applicable compliance requirements).

Because the compliance rules are configured with windows or ranges for amounts and with the same or relatively uniform compliance data requirements at the respective levels (with more compliance data required for higher levels), the transaction presented to the agent usually will be able to proceed. However, if the user increased the send amount or if the user has now used an agent located in a jurisdiction different than where staging was located, then different pricing and compliance rules may be applied. If these cause the transaction presented to be inconsistent with the compliance data recorded in staging (viewed under the applicable compliance windows), then the transaction may require re-staging. A change in currency exchange rates may also arise between the time of staging and the time of finalizing a send, and final pricing will be affected. After the sender pays the price (equal to the send amount plus fees), the agent confirms payment has been received and the agent terminal sends the transaction record with send amount, agent jurisdiction, and (if required) whether photo ID was verified to the data center again for commitment. The agent gives change, gets a signed receipt and provides a consumer receipt to the sender. The receipt has the reference no. assigned (committed send transaction no.). The transaction is committed at the data center by completing the committed send transaction record, with the status marked as open for payment (ready to receive).

Some examples show how the final test for consistency with compliance rules work. If a sender staged based on a send amount that was acceptable in staging as less than $A and less than $D under US to US compliance rules, but at an agent in the same jurisdiction used for staging the sender requests to send $X, falling in the compliance windows $A up to $B and/or $D up to $E, then the compliance window used for staging will be exceeded. The transaction will need to be reduced below $A and $D or to be restaged with a CSR collecting all needed compliance data for a higher-level compliance window. Similarly, if, for example, the sender staged a send that was acceptable as less than $A and $D under US to US compliance rules and now requests to send the same from State A, the data center needs to determine whether the amount falls in the compliance windows $0.01 up to $A1 or in $A1 up to $B1 and $0.01 up to $D1 and $D1 up to $E1, because $A and $A1 and $D and $D1 may not be the same. If a compliance window defined by the compliance rules of State A and now identified as applicable has been exceeded, the transaction will need to be reduced or restaged, with a CSR collecting all needed compliance data under the rules for the applicable level of compliance for a send from State A.

FIGS. 4A-4C show the interactions that are part of the method and implemented in the system of the present application for a receive transaction. As set forth in FIGS. 4A-4C, the method has a phase for receive transaction staging and a subsequent phase for receive transaction fulfillment. As with the actions and communications in FIGS. 3A-3C, the information provided to the CSR and the later interaction with the agent lead to two separate compliance rule analyses, which may lead to different results, if the same compliance rules are not applied. For a receive, the sent amount is fixed, so there will be no problem from a change in that amount, but there can be different jurisdictions involved in receive staging and in fulfilling a receive. Thus, the actions and communications in FIGS. 4A-4C for a receive staging and fulfillment are very similar to FIGS. 3A-3C, but simpler. One difference is that the receive can only be staged if the transaction status is unpaid (open for payment). Obviously, as soon as a recipient payout has occurred, the transaction status will go from unpaid to paid, to avoid duplicate payout. A second difference is that in receive fulfillment, the agent is not collecting money but paying it out, according to guidance from the agent terminal. Details can be found in FIGS. 4A-4C.

Compliance Table Interaction. In determining compliance rules, the applications 122 may need to apply compliance rules from more than one jurisdiction. To address this, the application logic can either (a) perform a computation that combines two or more compliance rule tables into a table that contains the strictest requirements for transactions of various size ranges, or (b) apply the tables of multiple jurisdictions sequentially for a given transaction, using a rule that selects the strictest requirement on both the send and receive sides applicable to a particular transaction size. The former may lead (in effect) to more compliance windows being defined, so that compliance windows are combined for a range where they require the same compliance data, but for any range where the multiple tables to be applied specify different compliance data, a new sub-range is defined that states the strictest rules. Thus, a transaction will be staged or finalized so as to satisfy the requirements of all applicable compliance rules by applying the strictest requirements of the applicable compliance windows.

Data Structures. The use of the system and method for a send transaction results in the creation of several data records. The staging phase results in a send transaction staging record. The funding/finalizing stage results in a final (or committed) send transaction record.

As best seen in FIG. 5A, a send transaction staging record 500 may typically include the following fields:
Staging Retrieval Key 510
Sender Name 512
Sender ID Data (address, . . . ) 514
Recipient Name/Location 516
Recipient Security Data (optional) 518
Compliance Data 520
Additional Transaction Information 522
Expiration Date 524

As discussed above, the content of the Compliance Data field 520 will vary according to what compliance rules are applied and according to the above discussed options for the format of that data. Additional Transaction Information 522 can include a transaction type code or any data used to further define the type of transaction or special details of its execution. In one embodiment, a send transaction staging record will be purged as soon as a corresponding committed send transaction is created using data from the staging record. However, in another embodiment the staging record can be saved with an expiration date. The Expiration Date field 524 may be used if a user is likely to enter into a series of similar transactions. The record stays available as a reusable staging record until the expiration date. Thus, it may be re-used by the sender and agent until that expiration date to streamline the sender's next agent interaction. Because the staging record is intended to enable finalizing any send transaction for which the sender has provided sufficient data to pass a compliance test associated with applicable compliance windows, the send staging record stores no proposed send amount.

The data center 120 can perform an analysis of usage history for a particular sender or for a relevant subset of senders to determine send transaction frequency. Such empirical analyses can be used to determine one or more appropriate time periods (e.g., three weeks, 35 days) for setting an expiration date, so that records last long enough to be useful for the next transaction but do not get stale and are not kept unnecessarily.

As best seen in FIG. 5B, a committed send transaction record 550 may typically include the following fields:
Send Transaction Key or Identifier 560
Send Amount 562
Service Type 564
Fees 566
Sender Name 568
Sender ID Data (address, . . . ) 570
Recipient Name/Location 572
Recipient Security Data (optional) 574
Compliance Data 576
Additional Transaction Information 578
Retention Information (optional) 580
Status 582

The fields in this record are self-evident or have been discussed above, with certain exceptions. The Service Type field 564 permits the send transaction to be performed with different modes of payout, other than a recipient visiting an agent for receive fulfillment. In areas where home delivery of the payout is available, or other forms of pick-up or delivery, these service types can be specified here. The Recipient Security Data 574 is a field that is used when it is desirable that identity of the recipient be better authenticated before payout. Here, in addition to whatever compliance information is required of a recipient, the recipient must answer a test question or provide some other identifying information that is defined by this field. The use of this field can be initiated by the sender or by the financial institution, for fraud deterrence. The Status field 582 is of particular importance because it defines whether the payout liability is still open (ready to receive) or is closed, because payout has been made. The optional Retention Information data 580 may be present to specify a period for keeping the record, which may be a regulatory requirement or part of the financial institution's record retention policy.

The committed send transaction records are records that represent the financial institution's obligations to make payments, as incurred by the agents and their interactions with the data center. Accordingly, these are normally kept in a database with high security levels against tampering and with advanced back-up and other disaster protection.

FIG. 6 is a schematic diagram showing the fields used in a receive staging record 600. A receive transaction staging record 600 may typically include the following fields:

Staging Retrieval Key 610
Recipient Name 612
Recipient ID Data (address, . . . ) 614
Send Transaction Pointer 616
Recipient Security Data (optional) 618
Compliance Data 620
Additional Transaction Information 622
Expiration Date (optional) 624

As discussed above, the content of the Compliance Data field 620 will vary according to what compliance rules are applied to the receive transaction and according to the above discussed options for the format of that data. The Send Transaction Pointer 616 is used to locate the committed send transaction record. This may be a direct pointer or a pointer to an index of some other list of pointers.

For all of the above records, the fields may contain the data itself or a pointer to it and may be structured as a flat file or according to the rules for a relational database or other suitable database format.

Payment Transactions. In addition to the send and receive transactions, the system and method described are suitable also for a payment transaction whereby a sender may send money to one of a list of billers that have developed a payment processing arrangement with the financial institution. Such billers may be utilities, car purchase financing organizations and the like. Referring again to FIG. 1, here the sender stages a send to make a payment to the biller by calling the CSR 30 and identifying the biller and the proposed payment/send amount. Once this has been staged, then the sender 10 goes to an agent terminal 50 to make the payment and cause the data center 120 to create the committed send record. This send amount then corresponds to a payment that the financial institution will make to an account of the biller for crediting to the sender's account with the biller. As with a person-to-person send, fees are typically charged and paid to the agent. There is pricing performed at both staging and finalizing, and the send transaction to the biller is equally subject to the compliance rules, applied in the same way. One additional operation that may occur with a payment transaction is entry of the user's account number with the biller, and checking of that account number to determine that it follows the biller's format and content rules for such numbers.

The actions and communications as set forth in the send staging and send finalizing phases of FIGS. 3A-3C apply generally to a payment transaction, except that the recipient is a biller, not an individual, and is usually sufficiently identified by a biller ID number. This will correspond to a particular entity at a particular location. Recipient Security Data typically is not needed, so the field may be left blank when this type of transaction is staged or be used for other information (such as sender account number at the biller). There is no need to have receive staging and receive fulfillment, because the payment sent is settled to the biller's account by settlement arrangements between the financial institution and the biller. Status information is handled differently, because the financial institution controls the transfer to the biller's bank account, which corresponds to payout.

In another embodiment, the payment is made not to a biller but to a person or rather that person's account in an institution. Thus, the send might be made to the account of a prison inmate or to a student account. Again no receive staging or fulfillment is needed.

Agent Terminal and Profile. The agent terminal 50 can take a variety of forms, including a specialized terminal with its own processor and on-board memory intended to have small counter "footprint" or a personal computer that is programmed with software to perform the desired agent operations but may also have other uses, e.g., as a component of a cash register. To communicate properly with the data center 120, the terminal must be configured. Also, the financial institution may want to ensure that the terminal 50 is governed by any business rules that have been agreed with the agent or agent group. Thus, the terminal may be configured with a profile that includes geographical information as mentioned above but also transaction size limits or services limits or options that are part of the agreed business rules. These rules can then be implemented as a transaction filter that is applied before a transaction is submitted for compliance analysis as discussed above. Thus, if a transaction is outside the agent amount limits on a send or receive, the rules at the terminal will cause that to be noted in a message displayed at the terminal, before the transaction is transmitted from the terminal to the data center. Similarly, a transaction that is not available at a particular agent can be flagged by local filtering at the agent terminal.

Figure 7:
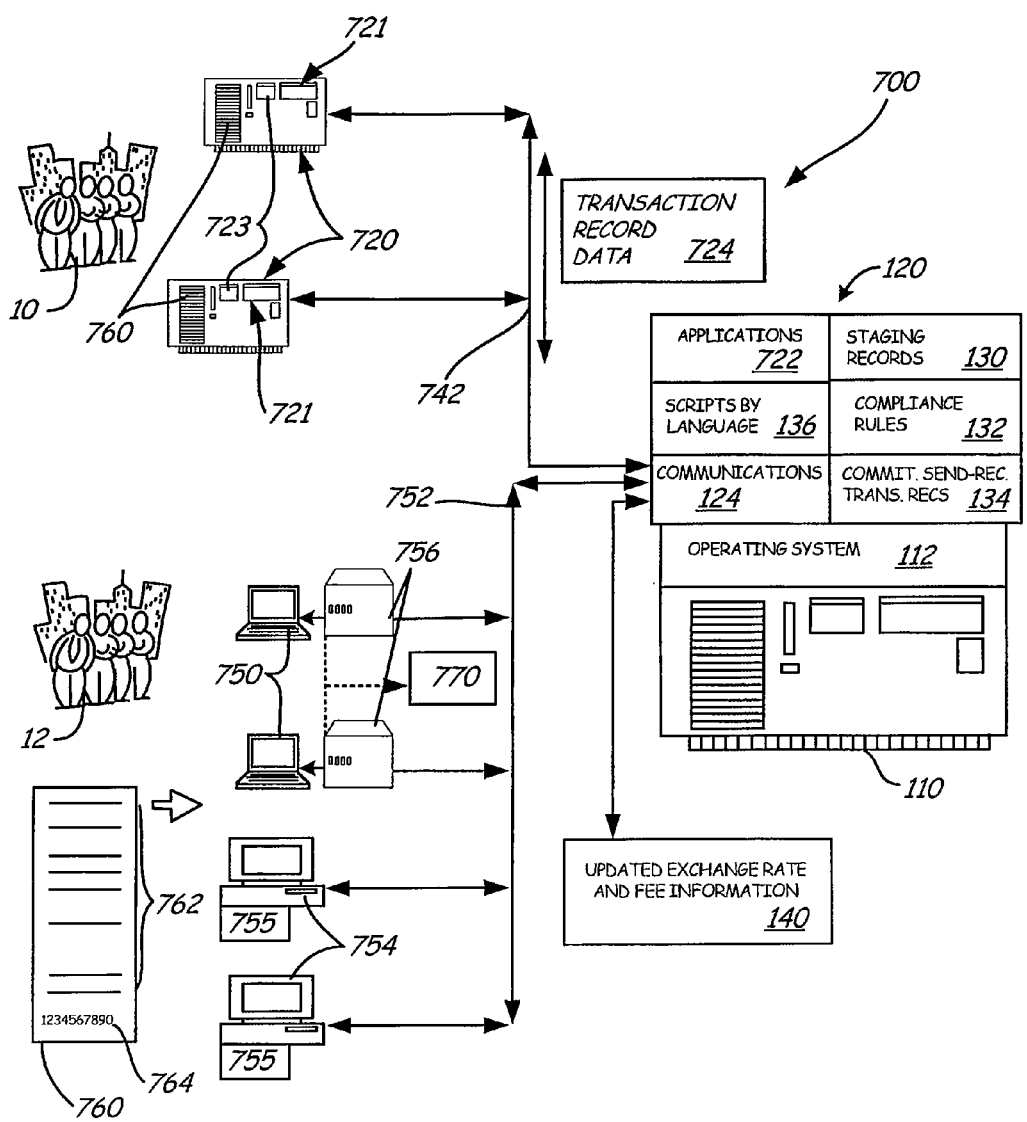
FIG. 7 is a schematic block diagram of a system for performing money transfer send, receive and payment transactions using a staging kiosk.

Basic Elements of System with Staging Kiosk. Additional efficiency in money transfer can be obtained with the use of a staging kiosk. This permits the staging process and subsequent fulfillment to be further automated, reducing call center needs and agent time. FIG. 7 is a schematic block diagram of a system 700 for performing money transfer send and receive transactions and payment transactions, where staging occurs at a kiosk 720 (i.e., a terminal that includes microprocessors or other data processors for executing stored software components and input and display means) that dispenses a staged transaction token 760 for facilitating fulfillment. In the system as shown in FIG. 7, users 10 (who at various times may be senders or recipients) use an automated terminal or kiosk 720 to stage a transaction without contact with a live CSR. To provide the same language capability as a multilingual staff at a call center, the kiosk may be configured with screen display sets using multiple languages, with the language selectable by the user. The kiosk devices 720 (only two are shown by way of example) are spread over the geography served by a financial institution that operates the money transfer system. A kiosk device 720 may be built into an ATM that performs other functions or may be a dedicated device located at or near an agent office. It typically has a display 721 and an input device 723, such as a keypad, touch screen or interactive voice response systems for spoken interaction. It also has a device for creating and dispensing the staged transaction token 760. In one embodiment, the kiosk device is a personal computer with appropriate software and a printer for producing the tokens as described below.

One purpose of a kiosk interaction is for a user to stage a send or payment transaction from the user to a person or entity, which may be located in the same country or in a different country from the sender. A second purpose of a kiosk interaction is for a recipient to stage a receive transaction, once a committed send transaction makes funds available. A common feature in both of these situations is to do the compliance work and other transaction preparation, and to do it without a CSR, so as to reduce the need for CSR personnel. A further feature is dispensing of the staged transaction token 760 bearing information 762 that streamlines agent activity and time required in the user's fulfillment of a staged transaction with an agent.

FIG. 7 thus also shows that persons 12 who are senders who have staged a transfer (or payment) or recipients who have staged a receive transaction may take their staged transaction token 760 to an agent office where there are agent terminals 754 or to an agent point of sale (POS) device 750 that has been integrated with an FI (financial institution) interface 756 to make efficient use of staged transaction tokens. There may be one or more agent locations with one or more agent terminals 754 or POS devices 750 spread over the geography served by a financial institution that operates the money transfer system (by way of example, only two of each are shown). The agents typically are set up to handle at least two kinds of interactions and transactions. First, if a sender 12 has previously used a kiosk and set up a send staging record, then the sender will go to the agent office to finalize the send with an actual final requested send amount with fees and to make the payment to the agent that enables the send to be finalized. Second, if the send transaction has already been funded and finalized and the committed transaction record is available for receiving (typically the recipient has staged the receive transaction), the recipient 12 can go to an agent office to obtain the funds sent.

FIG. 7 shows that a kiosk 720 is used to build a send staging record based on information provided to the kiosk by the sender 10 or a receive staging record based on information provided to the kiosk by a recipient 10. Once a staging record is built, the user (sender or recipient) 10 is issued a staged transaction token 760, which is schematically depicted at kiosk 720 as a document with a printed bar code, and may contain other information, including the alphanumerical equivalent of the bar code and brief text. The kiosk 720 is in communication with a central computer system or data center 120 via a transmission path 742, which may be a telephone line, data line, or other wired or wireless link, e.g., a leased line or a link using the Internet. The transmission path 742 terminates at a communications module 124 that can pass information to and from any of the software modules running on the hardware 110 and its operating system 112. The software modules include applications 722 that implement the various kiosk-based transaction functions discussed. The data used by applications 722 and other software includes staging records 130, records incorporating compliance rules 132, committed send transaction records 134 and the screen display scripts 136 in various languages. These may be in one or more separate databases. In one embodiment, separate databases are used, because the committed send transactions 134 are in a financial records database that is protected with greater security measures.

Including the screen display scripts 136 in the data center 120 permits central control of the kiosk functions and permits any kiosk to transact business in multiple languages. Such scripts provide a number of efficiencies in addition to opening up transactions to users of a variety of languages. The scripts may be customized to particular jurisdictions where kiosks are located, to the extent local compliance rules may require information or terms and conditions unique to a jurisdiction must be presented to users. That is, the applications 722 and the library of screen display scripts 136 may include association data that configures use of particular scripts by kiosk location. Further, when transaction requirements change because of changes in jurisdictional regulations, these changes can be implemented by software updates at data center 120, which cause new screens to be projected out to the various kiosks as needed. Further, changes to procedures for staging can be implemented by changing the screen display scripts. No additional CSR training is required to implement new staging procedures.

FIG. 7 also shows that agent terminals 754 and POS devices 750 (which include microprocessors or other data processors for executing stored software components) are in communication with the central computer system or data center 120 via a transmission path 752, which may be a telephone line, data line, or wired or wireless link. The transmission path 752 terminates at the communications module 124. FIG. 7 further shows that the central computer 120 receives updated exchange rate and fee information from data source 140, which derives the information from various market data and internal sources of the financial institution.

The kiosk 720 is one implementation for automation of portions of the system as shown in FIG. 1. At the kiosk device 720 a user 10 is guided through entry of information at a keyboard, touch-screen or other similar input device to provide information to and interact with software applications 722 (staging software consisting of various functional code components) running on a CPU at the data center 120. With the kiosk 720, the functions of the call center 32 and the CSR are performed in an interaction of the user at the kiosk 720 with the data center 120 operations. Voice interactions with a CSR are replaced by telecommunications interactions of the kiosk 720 and its software code components with staging software executing at the data center 120 and/or kiosk. The user input at the kiosk 720 provides the information necessary to build a staging record for the desired transaction and cause it to be stored with staging records 130. Although the kiosk 720 is used, in the record-building procedures for the records at the data center 120 the procedures are essentially identical to those performed when staging a transaction with a CSR, including the above discussed compliance rule application and the issuance of the retrieval key. (The retrieval key may specify the record directly or indirectly, by pointing to a source of an address or other locator information that in turn leads to the record.)

The user who is at a kiosk 720 dedicated solely to money transfer transactions may be presented with an introductory screen that asks for a language selection (e.g., English, Spanish, Arabic, etc.) and leads directly to the screen for initiating an interaction in that language. If the kiosk is an ATM where functions other than money transfer transfers are available, the initial screen may have numerous functional selections and may by a logo or other symbol to permit selection of money transfers provided by the financial institution, which will then lead to the introductory money transfer screen that asks for a language selection, followed by the screen for initiating an interaction in that language.

Figure 8A:
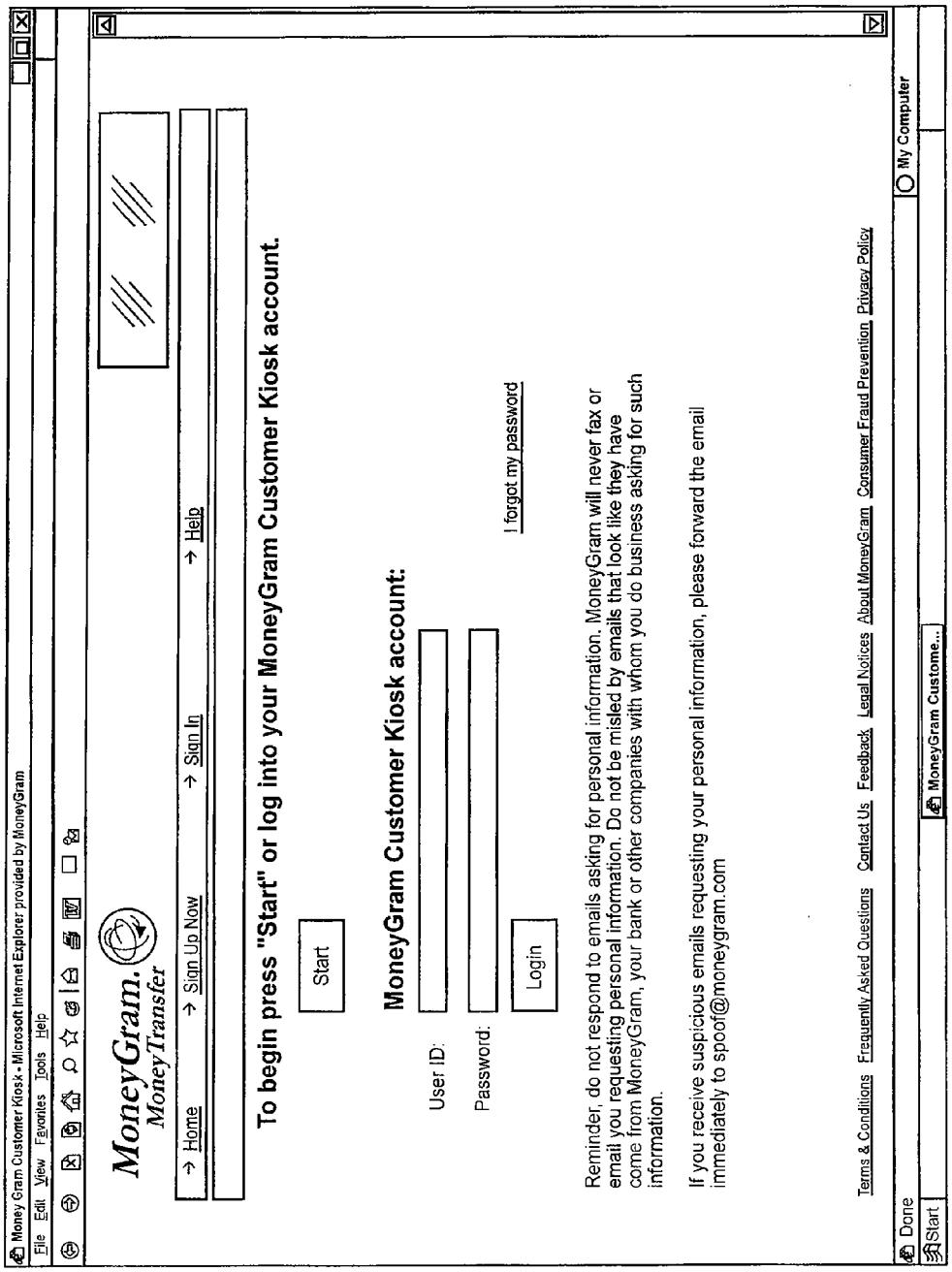

Methods and Interactions with Staging Kiosk. FIGS. 8A-8L show a sequence of example screens, assuming the user has selected the English language. Interactions in other languages would follow the same format to produce the same type of staging record. In FIG. 8A, the user is asked to sign in to his/her account, with a user ID and a password at fields 801. If the user has not set up an account, then he/she selects sign-up now and goes through a sequence of sign-up screens in which all required information for at least one money transfer transaction of the kinds available at this kiosk is elicited and stored as a user profile. This information depends largely on the regulatory environment for such transactions.

Figure 8B:
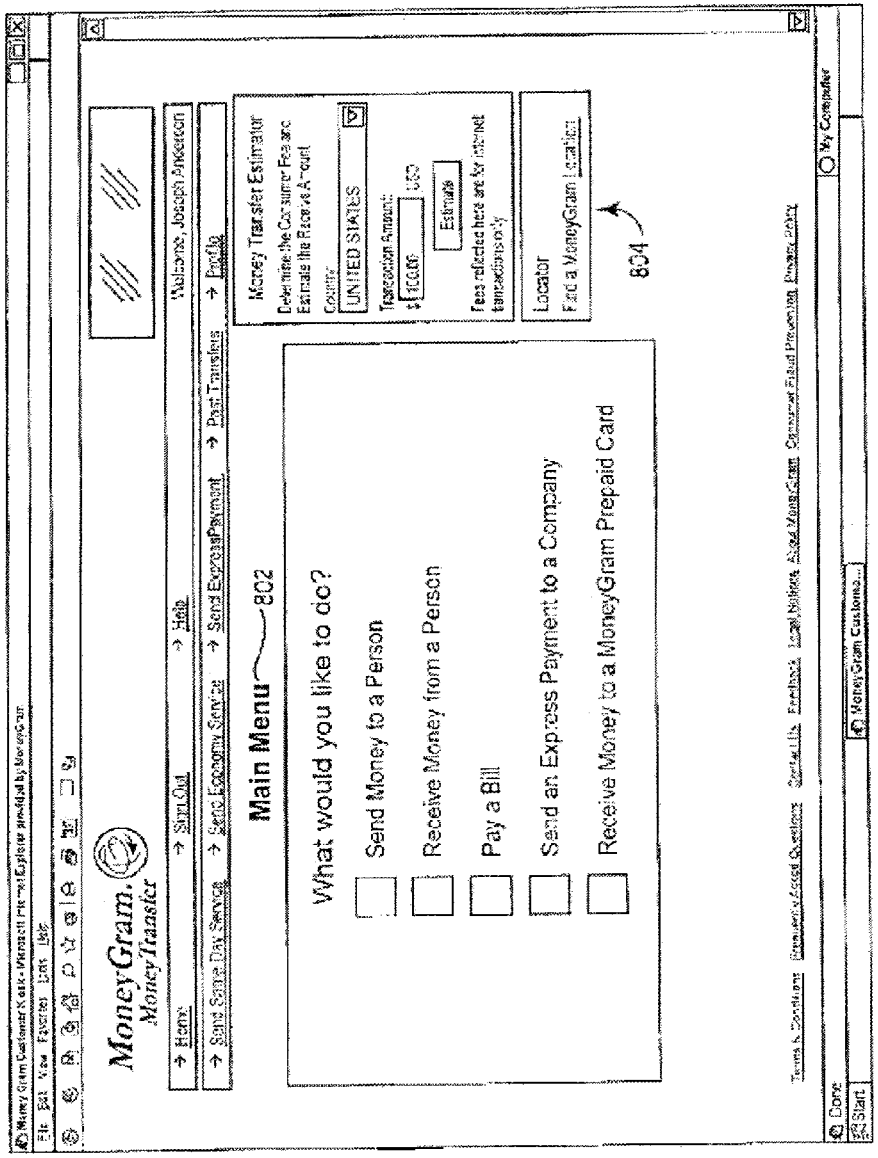
Figure 8C:
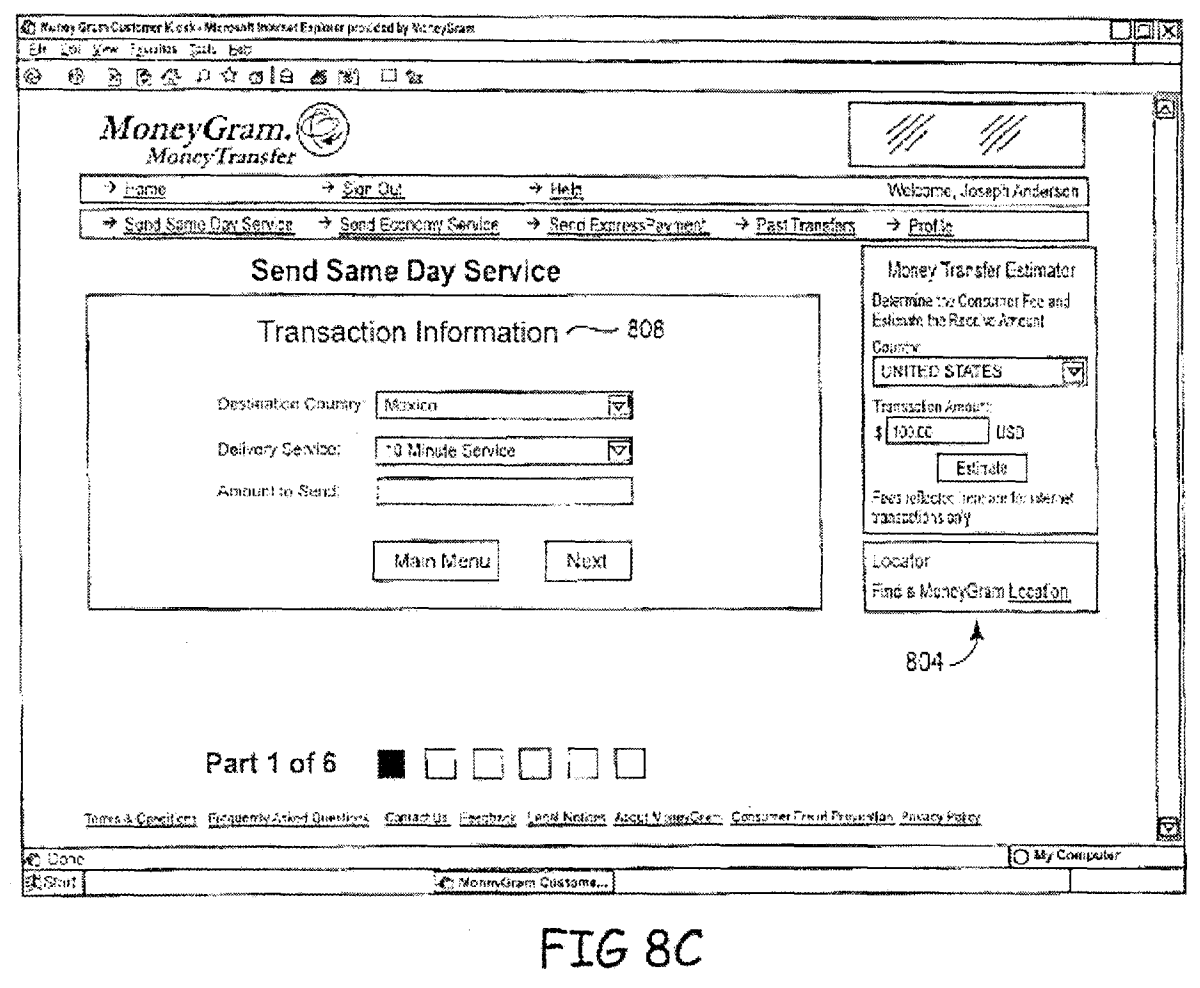
Figure 8D:
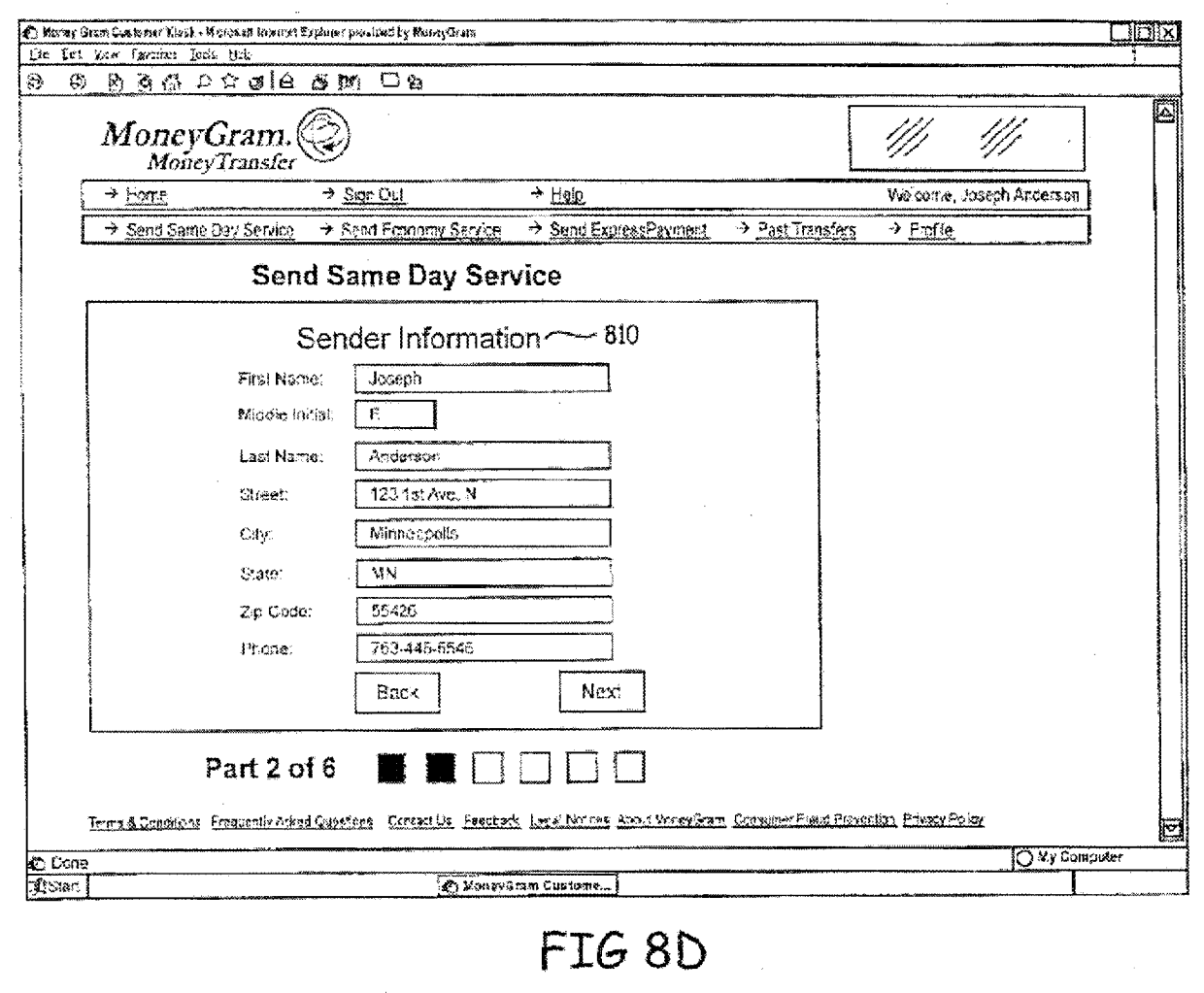
Figure 8E:
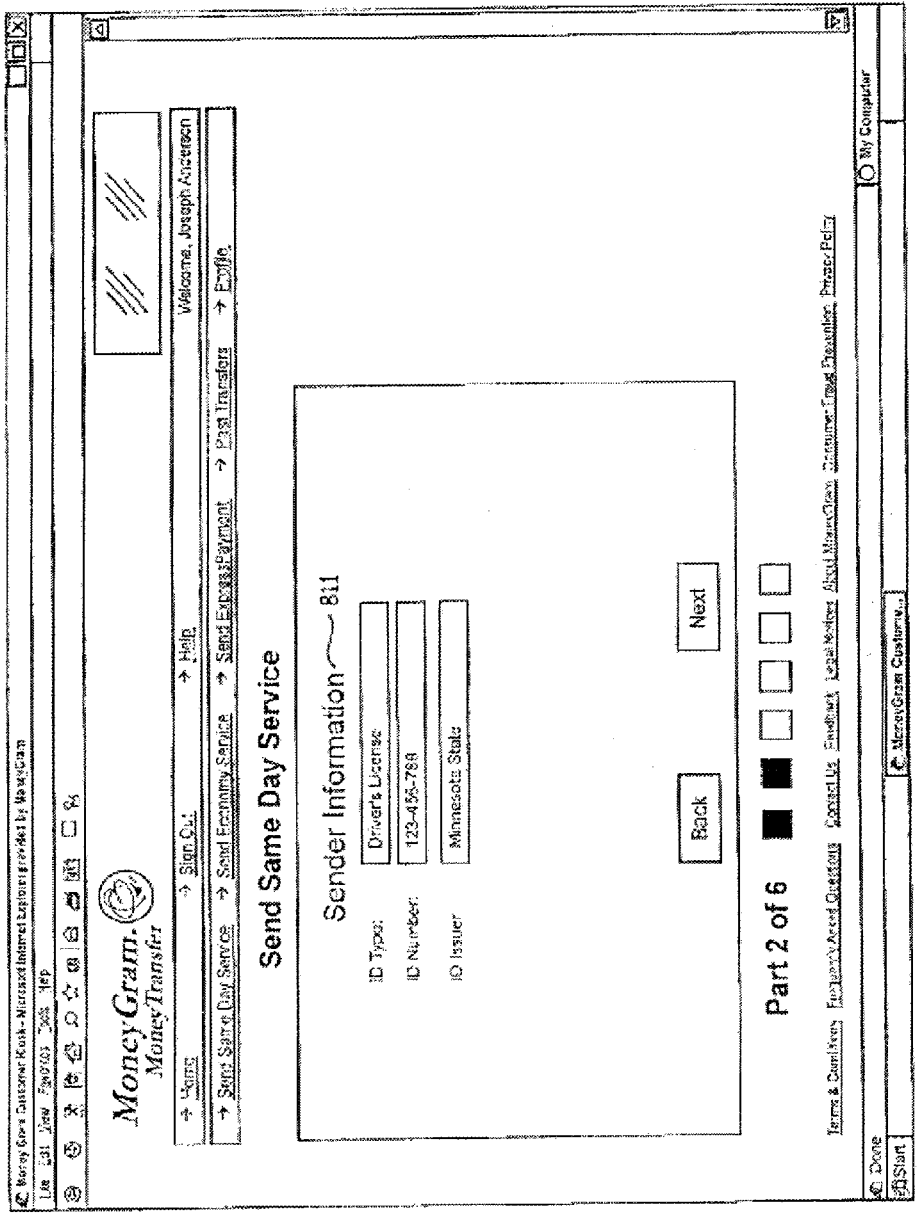
Figure 8F:
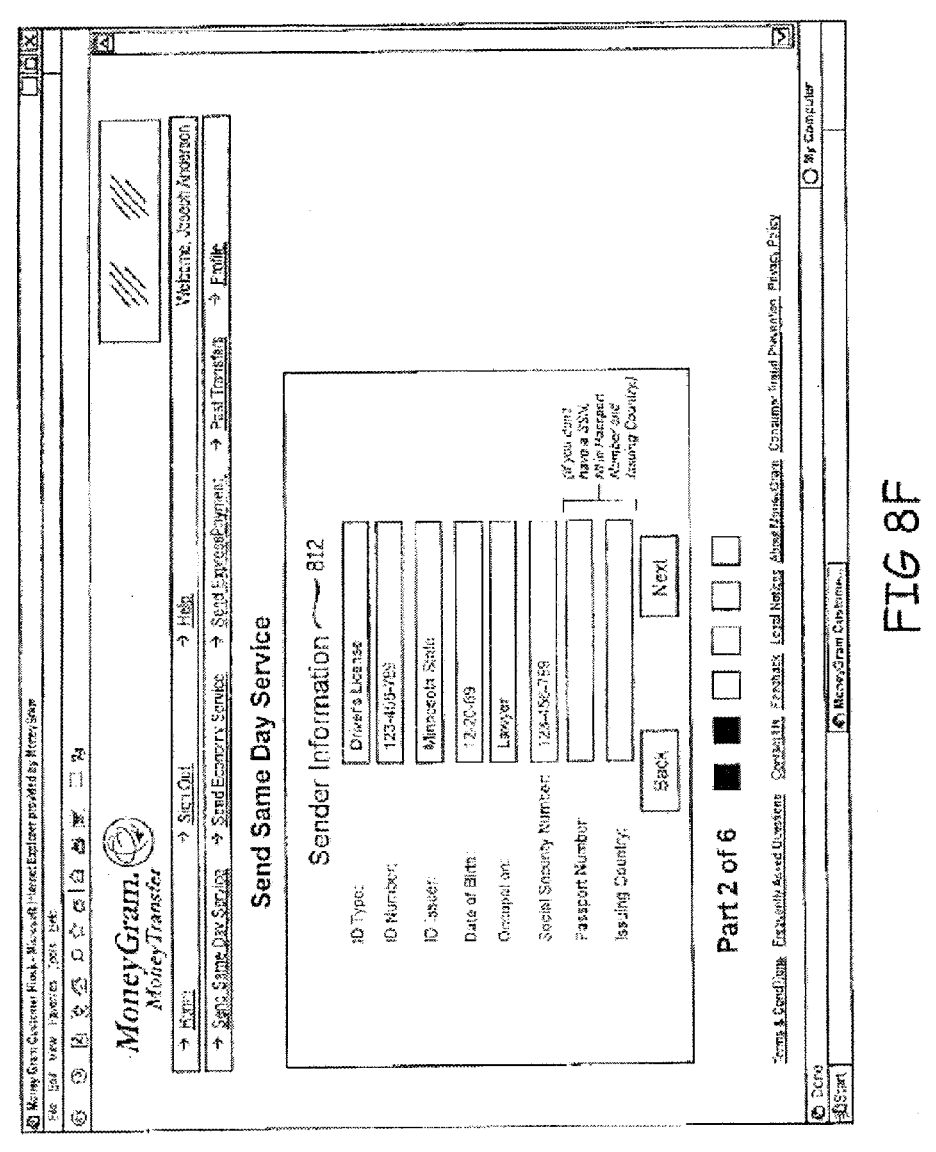

Once the user has progressed through sign-in (or sign-up followed by sign-in), as seen in FIG. 8B, a main menu 802 is presented for transaction type selection. In one embodiment as depicted in FIG. 8B, the options presented are: send money to a person, receive money from a person, pay a bill, send an express payment to a company or receive money to a prepaid card. Other options may be presented in other systems, such as purchase of items, e.g., phone cards, stamps, or other vending services. A money transfer estimator and agent locator window 804 may be presented on the same screen. If the user selected "send money to a person," then transaction information is solicited, including selection from the options shown across the second menu line at the top of FIG. 8C, e.g., send same day service, send economy service, as well as from a drop down menu of further service sub-options, such as "10 minute service." Thus, the transaction type selection screens allow both type and sub-type (e.g., a particular service) selection, resulting in a transaction type identifier being stored that may have more than one component to express all the selections. In FIG. 8C, the screen for "send same day service" is shown. Here the user is asked for the basic transaction information 808: destination country, delivery service (timing, mode of delivery and other options as offered by the financial institution) and amount to send. In a right hand portion of the screen, again a money transfer estimator and agent locator window 804 may be presented. A further screen shown at FIG. 8D calls for sender information 810, seeking the specific information called for by the fields shown. There may be a further screen as shown at FIG. 8E or FIG. 8F that seeks additional information for sender identification 811, 812, with FIG. 8F showing the greater amount of information 812 that may be called for when a higher value transaction is involved. In one embodiment, the sender information screens may be pre-populated, based on the user profile stored at sign-up.

Figure 8G:
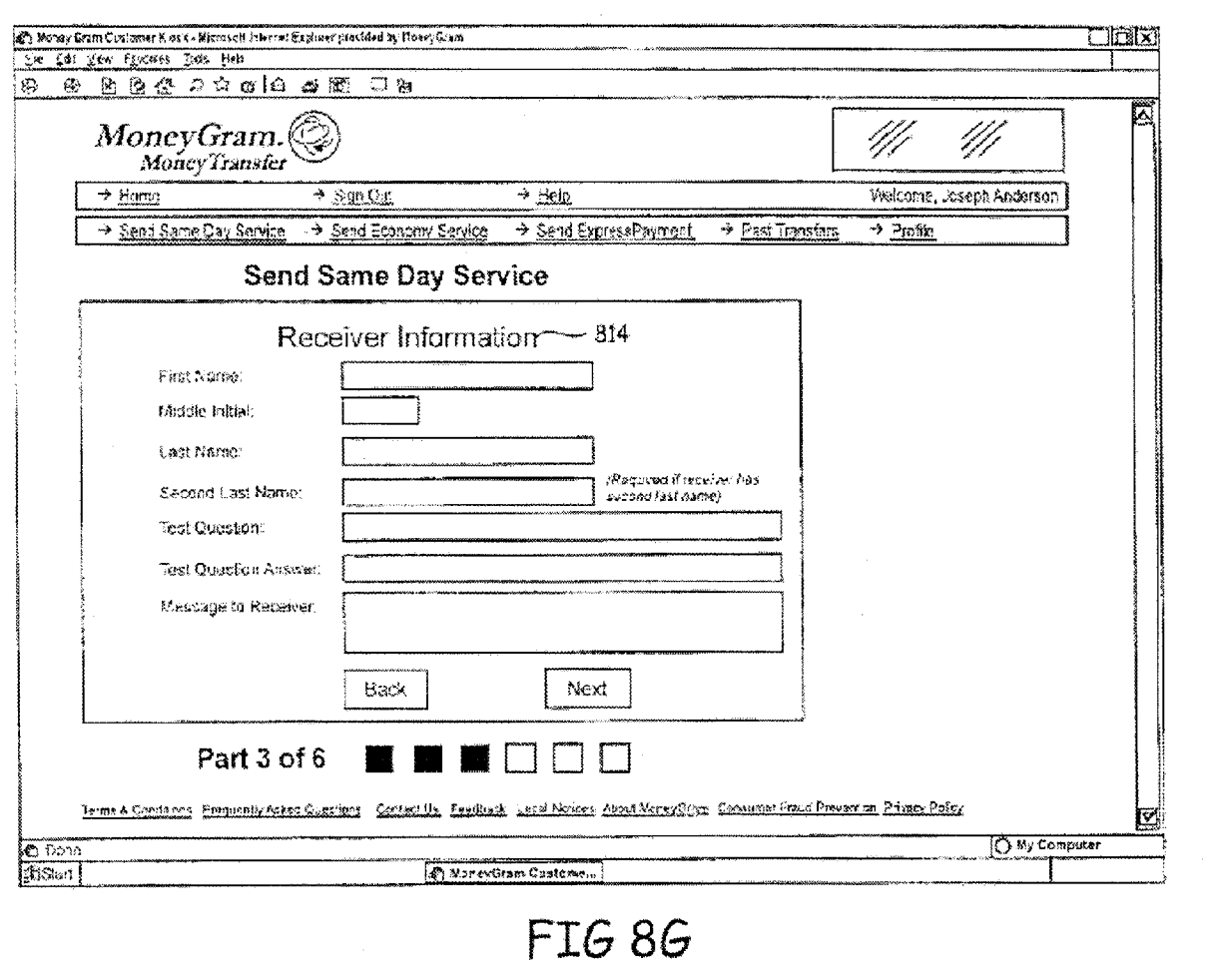
Figure 8I:
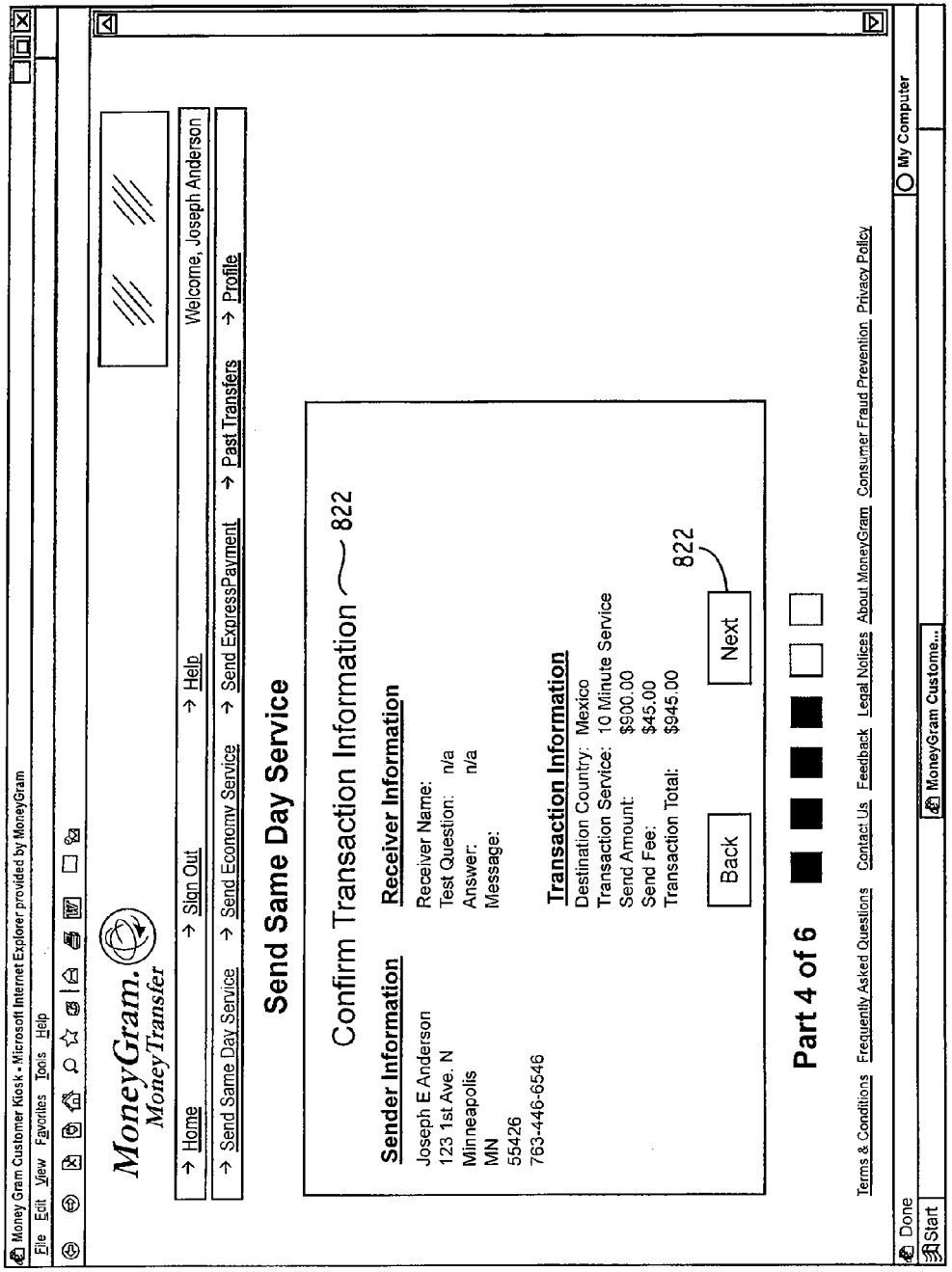

FIG. 8G calls for receiver information 814, seeking the specific information called for by the fields shown. If the sender does not wish to use a test question, a simplified form of the receiver information 816 may be elicited, as seen at FIG. 8H. In FIG. 8I is shown the screen for presenting for confirmation the transaction information (including pricing) that will become the basis for a staging record and providing the Next button 822 to indicate confirmation and move to completion.

Figure 8J:
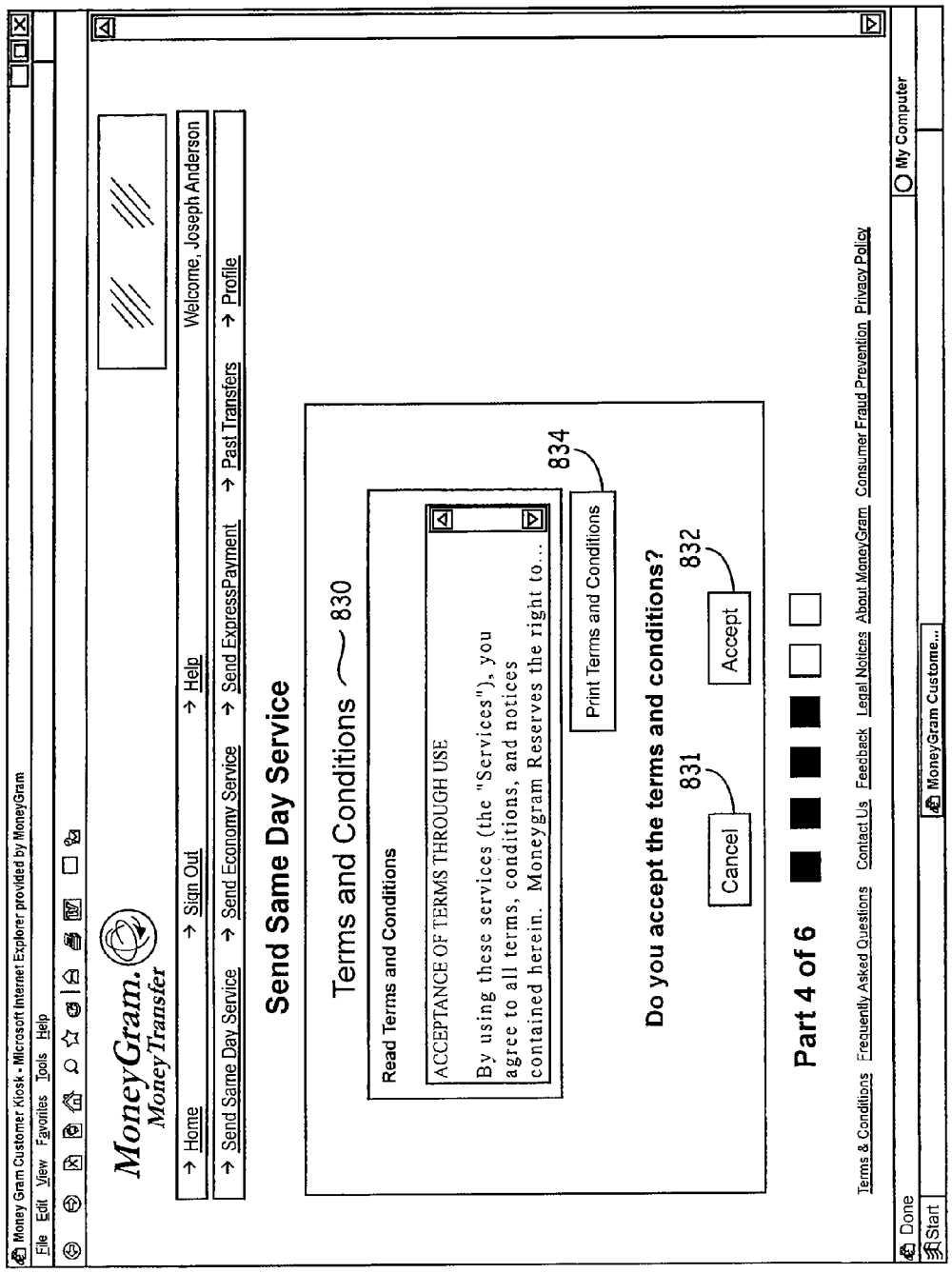

In FIG. 8J is shown the terms and conditions display with buttons to cancel 831 or accept 832 the transaction per the details confirmed and terms and conditions presented. The user is also given the option to print out the terms and conditions with button 834. To the extent these need to be varied by jurisdiction, as noted, a library of terms and conditions may be maintained on kiosk 720 or on the system 120 (in screen display scripts 136, see FIG. 7) for display at the kiosk 720. Thus, the kiosk permits the financial institution to present and document acceptance of the legal terms and conditions. The stored staging record may include all the send/payment record information fields shown in FIGS. 5A and 5B above and may include a field to record user acceptance in association with a date/time, e.g., as part of Additional Transaction Information 522, 578 or 622 shown above (see FIGS. 5A, 5B, 6). Clear and early indication of agreement to all terms and conditions governing the transfer can be documented in the data center 120 with a direct response from the user.

Assuming the user selects "I accept," the user moves to the display screen shown in FIG. 8K. This shows the image of a staged transaction token 840 that will be printed and dispensed from the kiosk 720 for later use by the user. The token image 840 includes a bar code image 843 that includes certain encoded staging transaction information. In one embodiment, this information includes a retrieval key or reference number for the transaction that has been staged, the amount of the transaction and any agent identification that may be associated with the staging kiosk 720. The user selects the action of printing with button 844 and will receive the printed token 760 on a slip of paper or other printable substrate dispensed from the kiosk 720. In other embodiments, the token dispensed may be a card with a memory strip, an RFID device or other similar machine-readable token capable of storing unique staged transaction information developed at the kiosk. A final screen shown in FIG. 8L shows a closing message 850 for the user, with instructions on what to do next; i.e., instructions on transaction fulfillment.

For security purposes, it may be desirable that one or more fields of information stored on the token 760 are encoded. For example, it may be desirable to encode the retrieval number as a bar code or its printed alphanumeric equivalent, so that the number on the token 760 is not the actual number identifying a staging record at the data center 120, but rather one that can be decoded into that number by decoding software at the data center 120 or the agent terminal. The same may be true of any encoded transaction amount. Also, special hash or other authentication codes derived from the transaction information may be included to evidence authorization of the token by the financial institution. Such security measures to encrypt or authenticate the content of a token 360 help prevent use or acceptance of fraudulent tokens.

Referring again to FIG. 7, use at an agent of a staged transaction token 760 printed from the token image 840 is described. The user takes the token 760 to an agent location, which may be adjacent the kiosk or at some distance. Here fulfillment of the staged transaction can occur. The token 760, with its bar code 162 and alphanumeric equivalent, helps speed and facilitate fulfillment. The lower half of FIG. 7 shows two different equipment situations that may exist at the agent. In one embodiment the agent location has an agent terminal 754 that communicates directly to the financial institution data processing system 120. This terminal 754 may be equipped with a token reader 755 that reads the bar-code or other information from the token 760 and uses that to formulate a message to the system 120 requesting retrieval of the staged transaction record identified by the token 760. If the agent terminal does not have a token reader 755, then the agent can read alphanumeric characters 764 printed on the token and key those in, to prepare the same staging record retrieval message to system 120.

In another embodiment, the agent has a POS device 750 that has a conventional bar code or other scanner for reading barcodes (using SKU, UPC or other conventional or custom bar-coding systems) on products, coupons or the like that are part of the conventional POS activities. (If the token 760 is a card with a magnetic stripe or other storage device, the reader is of a type that permits that card to be scanned and read.) This permits the token 760 to be machine scanned/read and the scanned data taken in like other items (e.g., purchased products) handled by the POS device, except that the POS device is integrated with an FI interface 756 with a filter that checks bar code data read and that shunts a predefined set of staged transaction barcodes to be processed by the FI interface 756. The set of bar codes sensed by the filter may be based on a single FI code or a set of codes that are unique relative to other bar codes that that the POS may encounter for other (non-money transfer) POS transactions. The FI interface filter detects the barcodes that represent tokens calling for money transfer transaction fulfillment and, as with the agent terminals 754, formulates a message to the system 120 requesting retrieval of the staging record identified by the token 760. Thus, the POS device 750 is integrated with the FI interface 756, so that the FI interface 756 can recognize a token-derived bar code as a staged transaction that needs to be fulfilled (as opposed to, e.g., a candy bar purchase) and initiates a message to the financial institution system 120. The same POS device 750 will perform normal processing of scannable items other than staged transaction tokens (e.g., item price look-up, inventory adjustment, etc., in the case of a product bar code). It will pass the bar codes scanned to the data systems 770 provided by the POS operator for its traditional transactions, and may enter the bar code from a token 760 into records for the POS entity as a matter of agent record-keeping. Thus, the POS operator may track the money transfer transactions in a separate accounting system or the same one that receives other transactions from the POS.

In either embodiment where the bar code of a staged transaction token 760 is automatically read or manually entered, the information read from the token 760 is passed to the financial institution data center 120, where it is parsed for a retrieval key (and authentication data or other encoded data as desired). The transaction type or other encoded information also may be recognized. The corresponding staging record is found (or an exception noted and communicated to the agent, if not found) and the staged transaction can be handled by the agent for fulfillment. To aid fulfillment, the financial institution transmits to the POS device 750 or agent terminal 754 attendant step-by-step instructions to guide the attendant in the actions required for transaction fulfillment and to capture accounting and regulatory data for the transaction. At this point the actions of the operator/agent are very similar to those for transaction fulfillment without a token already discussed above, except that where the token has been scanned, the operator has not needed to enter any data into any device in order for the transaction to be recognized, the staging record found and the instructions for fulfillment sent. The attendant/agent need only enter data not previously finalized or any that might be required at the time of fulfillment. Where it is known that the POS attendant typically will not frequently see money transfer transactions, the instructions can be prepared to provide appropriate detail for guidance, including graphical cues and images that may aid any identification checks required.

For example, in the case of a send transaction, the token 760 causes the corresponding send transaction staging record to be located. The agent can confirm the total amount of payment due, confirm that compliance rules have been complied with or ask for identification to effect that and collect cash or other permitted payment from the user. Once the agent completes these actions, the transaction is no longer in the form of a staging record awaiting fulfillment; it becomes a committed send in the committed send transaction records.

For a further example, in the case of a receive transaction, the token 760 when read at the POS causes the corresponding receive transaction staging record to be located. The agent can confirm the receive transaction is still open and the amount of payment to be made to recipient, confirm that compliance rules have been complied with or ask for identification to effect that and pay cash or money orders to the user. Once the agent completes these actions, the transaction is no longer in the form of a receive staging record awaiting fulfillment; it becomes a completed receive transaction record.

Figure 9:
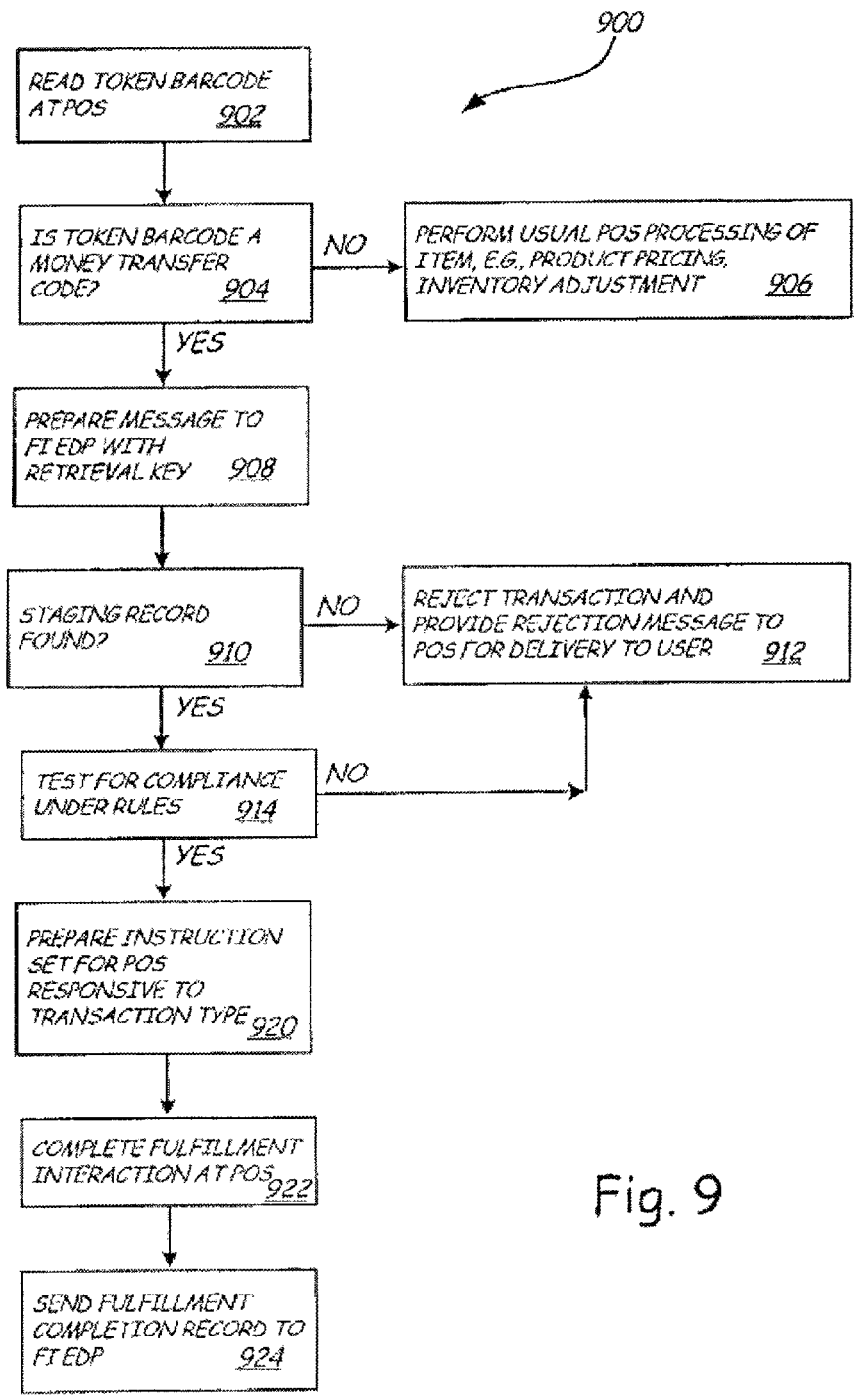
FIG. 9 is a flowchart showing the steps performed when a staged transaction token is read at a POS device integrated with a financial institution interface.

To further illustrate the method of using a staged transaction token 760 for fulfillment, FIG. 9 shows a flowchart of the process 900 at an integrated POS as just described. The user, having been issued a token 760 at a kiosk 720, takes it to an agent location. At step 902, the barcode is scanned as an item and read at a POS device, such as a barcode reader-equipped check-out register. At step 904, the FI interface 756 applies a filter to determine if the barcode read is for a money transfer. This may be recognized by a transaction type code embedded in the barcode or other encoded indicia in the barcode. If the barcode is not for a money transfer, then the usual POS processing of the item as determined by the agent location occurs at step 906. If the barcode read is for a money transfer, then at step 908, the FI interface 756 prepares a message to the financial institution data center 120 that includes retrieval key data. At step 910, the data center 120 determines if a corresponding staging record is found. If the retrieval key does not lead to a staging record, then the transaction is rejected and the data center 120 provides a rejection message to the POS for delivery to a user at step 912. If the retrieval key does lead to a staging record, then the transaction proceeds. At step 914, compliance rules are applied to make a final check that the transaction about to be completed complies with applicable regulations. If the compliance rules are not met, then the transaction is rejected and the data center 120 provides a rejection message to the POS for delivery to a user at step 912. If compliance is found, at step 920, the data center 120 initiates a control component to cause a set of instructions for handling the transaction to be displayed at the POS. These instructions specify the collection of cash to fund a send or payment transaction and any identification check required for compliance; or the instructions may specify the forms and amounts for payment and security questions or compliance procedures for dispensing of payment to a recipient. That is, the POS operator is guided by instructions that specify each step in the fulfillment transaction, responsive to the transaction type and based on the staging record information. At step 922, the user and agent complete the fulfillment interaction at the POS. At step 924, the POS device sends a transaction fulfillment completion record to the data center 120 so that the transaction can be shown in the record data 724 as fulfilled. The POS device also may send data to any accounting system of the POS operator.

It can be seen from these examples that use of the staged transaction token 760 has multiple advantages. The data may be read automatically from the token, avoiding the possibility of operator error. To initiate retrieval, the operator does not need to perform any manual entry, which is time consuming. Further, for a POS system with a bar code reader and FI interface the money transfer transactions become better integrated into the agent's POS equipment and accounting systems. The bar code is read and need only be recognized as a transaction involving the financial institution. Initiation of the user-agent fulfillment interaction occurs without encountering any language problems that might arise if the user and the agent personnel have no common language. Thus, the retrieval data can be efficiently captured and communicated to the financial institution and greater automation is possible.

Although the present invention has been described with reference to preferred embodiments, persons skilled in the art will recognize that changes may be made in form and detail without departing from the spirit and scope of the invention.

The invention claimed is:
1. A transaction method comprising:
receiving bill payment transaction information from a user terminal at a kiosk, the bill payment transaction infor- mation including sender and biller information, wherein the sender has an account with the biller;

building a staging record for the bill payment transaction at a data center in communication with the kiosk, the staging record comprising the bill payment transaction information and a retrieval key;

providing the retrieval key to the sender at the kiosk, the retrieval key to identify the staging record for finalizing the bill payment transaction, wherein:

if the retrieval key leads to the staging record at the data center, the bill payment transaction proceeds to credit a send amount to the account of the sender with the biller; and if the retrieval key does not lead to the staging record at the data center, the bill payment transaction is rejected.

2. The method of claim 1, further comprising voice entry of information necessary for the bill payment transaction at a call center, wherein the call center is a component of the data center.

3. The method of claim 1, wherein finalizing the bill payment transaction is performed at an agent location in communication with the data center.

4. The method of claim 3, wherein finalizing the bill payment transaction comprises payment of an actual requested send amount to an agent at the agent location, the payment to the agent enabling the transaction to be finalized.

5. The method of claim 1, wherein the bill payment transaction information includes a proposed send amount.

6. The method of claim 5, wherein the bill payment transaction information includes compliance data, and further comprising testing the compliance data for consistency with a compliance window based on compliance rules for the proposed send amount and the sender and recipient information.

7. The method of claim 1, wherein providing the retrieval key comprises providing the sender with a transaction token having staging information, and wherein finalizing the bill payment transaction comprises parsing the staging information for the retrieval key at the data center.

8. The method of claim 1, wherein finalizing the bill payment transaction comprises completing a committed send transaction using data from the staging record, the committed send transaction making funds available to pay the send amount to the biller.

9. The method of claim 8, further comprising purging the staging record as soon as the committed send transaction is created.

10. The method of claim 8, wherein the staging record stays available as a reusable staging record.

11. The method of claim 10, further comprising saving the staging record with an expiration date, wherein the staging record stays available as the reusable staging record until the expiration date.

12. A method of performing a staged payment transaction, the method comprising:

receiving transaction information from a user terminal at a kiosk in communication with a data center, the transaction information including sender and biller information, a proposed send amount and compliance information;

providing the sender with a staged transaction token having staging information including a retrieval key for finalizing the staged payment transaction;

building a staging record for staging the payment transaction at the data center, the staging record comprising the transaction information, the compliance information and the retrieval key;

testing the compliance data for consistency with compliance rules based on the proposed send amount and the sender and biller information; and parsing the staging information on the staged transaction token to finalize the staged payment transaction, wherein:

if the retrieval key leads to a corresponding staging record at the data center, an actual requested send amount is credited to the account of the user at the biller; and if the retrieval key does not lead to a corresponding staging record at the data center, rejection message is provided for delivery to the sender.

13. The method of claim 12, further comprising voice entry of information necessary for the staged payment transaction at a call center that is a component of the data center.

14. The method of claim 12, wherein finalizing the staged payment transaction comprises payment of the actual requested send amount at an agent location in communication with the data center, the payment enabling the staged payment transaction to be finalized.

15. The method of claim 12, wherein finalizing the payment transaction comprises completing a committed send transaction making funds available to pay the actual requested send amount to the biller, and further comprising purging the staging record as soon as the committed send transaction is created.

16. The method of claim 12, further comprising saving the staging record with an expiration date, wherein the staging record stays available as a reusable staging record until the expiration date.

17. A staged bill payment transaction system comprising:

an automated kiosk with a user terminal configured to receive bill payment transaction information from a sender having an account with a biller; and a computer system in communication with the automated kiosk, the computer system configured to build a staging record comprising the bill payment transaction information and a retrieval key provided to the sender at the automated kiosk; and a data center for storing the staging record including the retrieval key for finalizing the staged bill payment transaction, wherein:

if the retrieval key leads to a corresponding staging record at the data center, a send amount is credited to the account of the sender with the biller; and if the retrieval key does not lead to a corresponding staging record at the data center, the staged bill payment transaction is rejected.

18. The staged bill payment system of claim 17, wherein the bill payment transaction information includes sender and biller location information, the send amount and compliance data, and wherein the computer system is further configured to test the compliance data for consistency with a compliance window for money transfers based on compliance rules for the send amount and the sender and biller location information.

19. The staged bill payment system of claim 17, wherein the automated kiosk is configured to provide the sender with a staged transaction token having staging information including the retrieval key, the staging information readable at an agent location for passing to the data center, wherein the staging information is parsed for the retrieval key in order to finalize the staged bill payment transaction.

20. The staged bill payment system of claim 17, wherein the computer system is further configured for completing a committed send transaction making funds available to pay the send amount to the biller, wherein the staging record stays available as a reusable staging record.

* * * * *